United States Patent
Aki

(10) Patent No.: US 6,843,394 B2
(45) Date of Patent: Jan. 18, 2005

(54) ROOF CARRIER MOUNTING STRUCTURE

(75) Inventor: Makoto Aki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 120 days.

(21) Appl. No.: 10/209,010

(22) Filed: Aug. 1, 2002

(65) Prior Publication Data

US 2003/0000978 A1 Jan. 2, 2003

Related U.S. Application Data

(62) Division of application No. 09/456,565, filed on Dec. 8, 1999, now Pat. No. 6,491,192.

(30) Foreign Application Priority Data

Dec. 9, 1998  (JP) ............................................ 10-349899
Mar. 5, 1999  (JP) ............................................ 11-59313

(51) Int. Cl.[7] ................................................ B60R 9/04
(52) U.S. Cl. ........................ 224/309; 224/321; 224/326; 224/329; 224/331
(58) Field of Search ................................. 224/309, 321, 224/325, 326, 329, 331, 330, 315, 558

(56) References Cited

U.S. PATENT DOCUMENTS

| | | | |
|---|---|---|---|
| 2,600,082 A | 6/1952 | Sumner | |
| 2,663,472 A | 12/1953 | Belgau | |
| 3,239,115 A | 3/1966 | Bott et al. | |
| 3,899,111 A | 8/1975 | Binding et al. | |
| 4,266,708 A | 5/1981 | Bott | |
| 4,383,628 A | * 5/1983 | Hiller | 224/319 |
| 4,432,479 A | 2/1984 | Graber | |
| 4,448,336 A | 5/1984 | Bott | |
| 4,877,169 A | 10/1989 | Grim | |
| 5,016,799 A | 5/1991 | Stapleton | |
| 5,104,020 A | 4/1992 | Arvidsson et al. | |
| 5,275,320 A | 1/1994 | Duemmler | |
| 5,419,479 A | 5/1995 | Evels et al. | |
| 5,423,465 A | 6/1995 | Kauka et al. | |
| 5,492,258 A | 2/1996 | Brunner | |
| 5,556,221 A | * 9/1996 | Brunner | 224/321 |
| 5,730,343 A | * 3/1998 | Settelmayer | 224/321 |
| 5,845,828 A | * 12/1998 | Settelmayer | 224/321 |
| 5,862,964 A | 1/1999 | Moliner | |

FOREIGN PATENT DOCUMENTS

| | | |
|---|---|---|
| DE | 81 36 129 U | 6/1982 |
| DE | 90 15 530 U | 2/1991 |
| DK | 2551646 | 6/1977 |
| FR | 1002418 | 3/1952 |
| FR | 2559110 | 8/1985 |
| IT | 372627 | 7/1939 |
| IT | 459722 | 7/1939 |
| JP | 57-047233 | 3/1982 |
| JP | 194642 | 11/1983 |
| JP | 5-65043 | 3/1993 |
| JP | 7-2025 | 1/1995 |
| JP | 7-237505 | 9/1995 |
| NL | 8402879 A | 4/1985 |

* cited by examiner

Primary Examiner—Nathan J. Newhouse
(74) Attorney, Agent, or Firm—Finnegan, Henderson, Farabow, Garrett & Dunner, LLP

(57) ABSTRACT

It is an object of the present invention to provide a roof carrier structure capable of reducing the amount of movement of a roof carrier for a vehicle during the rapid acceleration or deceleration of the vehicle. In order to achieve this object, there is provided a roof carrier mounting structure for mounting a roof carrier on a member to which a roof carrier is mounted of a vehicle, comprising a roof carrier; and an inclined portion formed on the roof carrier and inclined to gradually approach or move away from a member to which a roof carrier is mounted in a longitudinal direction of a vehicle for converting inertia force acting on the vehicle in the longitudinal direction into a fastening force for fastening the roof carrier to the member to which a roof carrier is mounted.

6 Claims, 30 Drawing Sheets

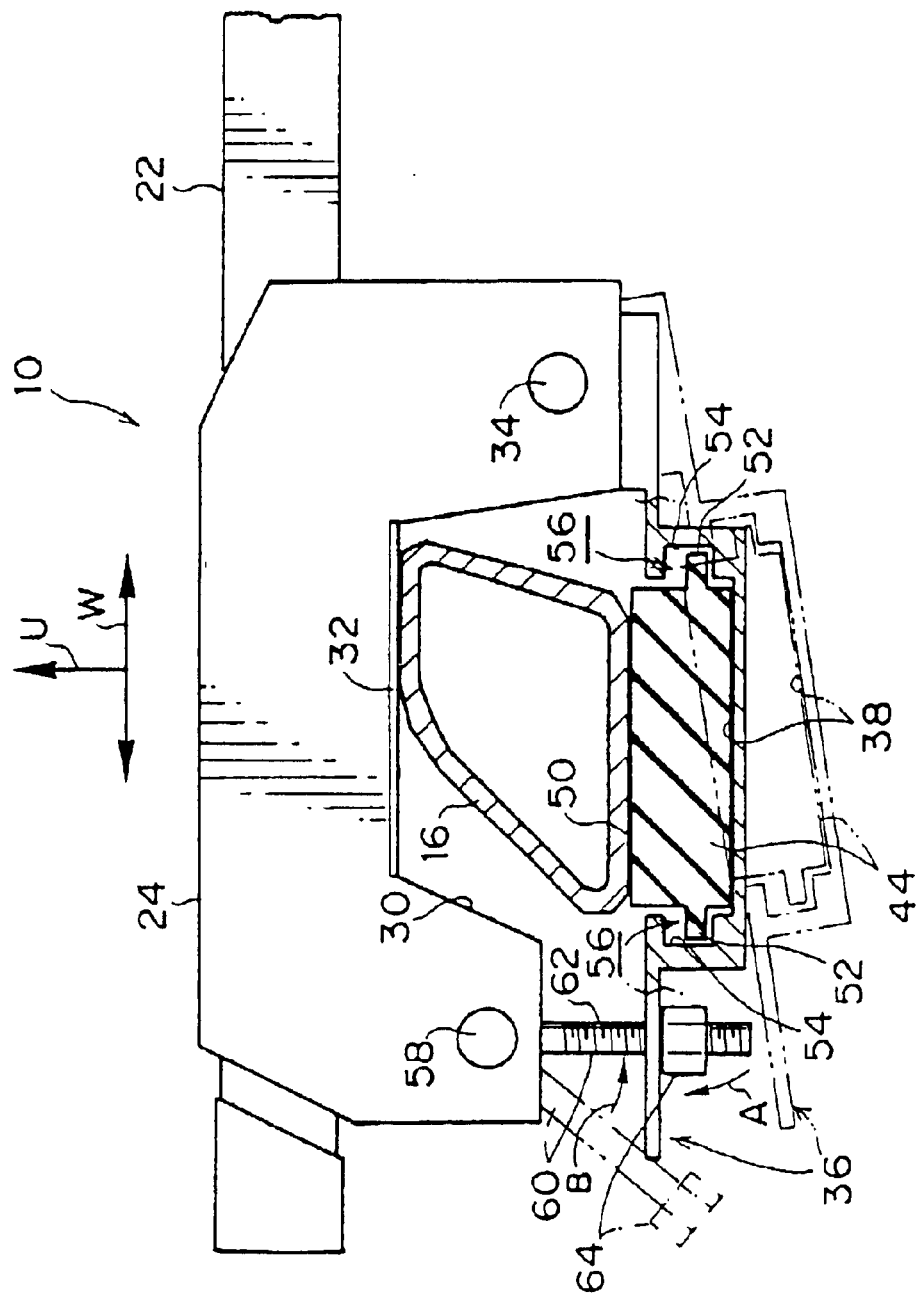

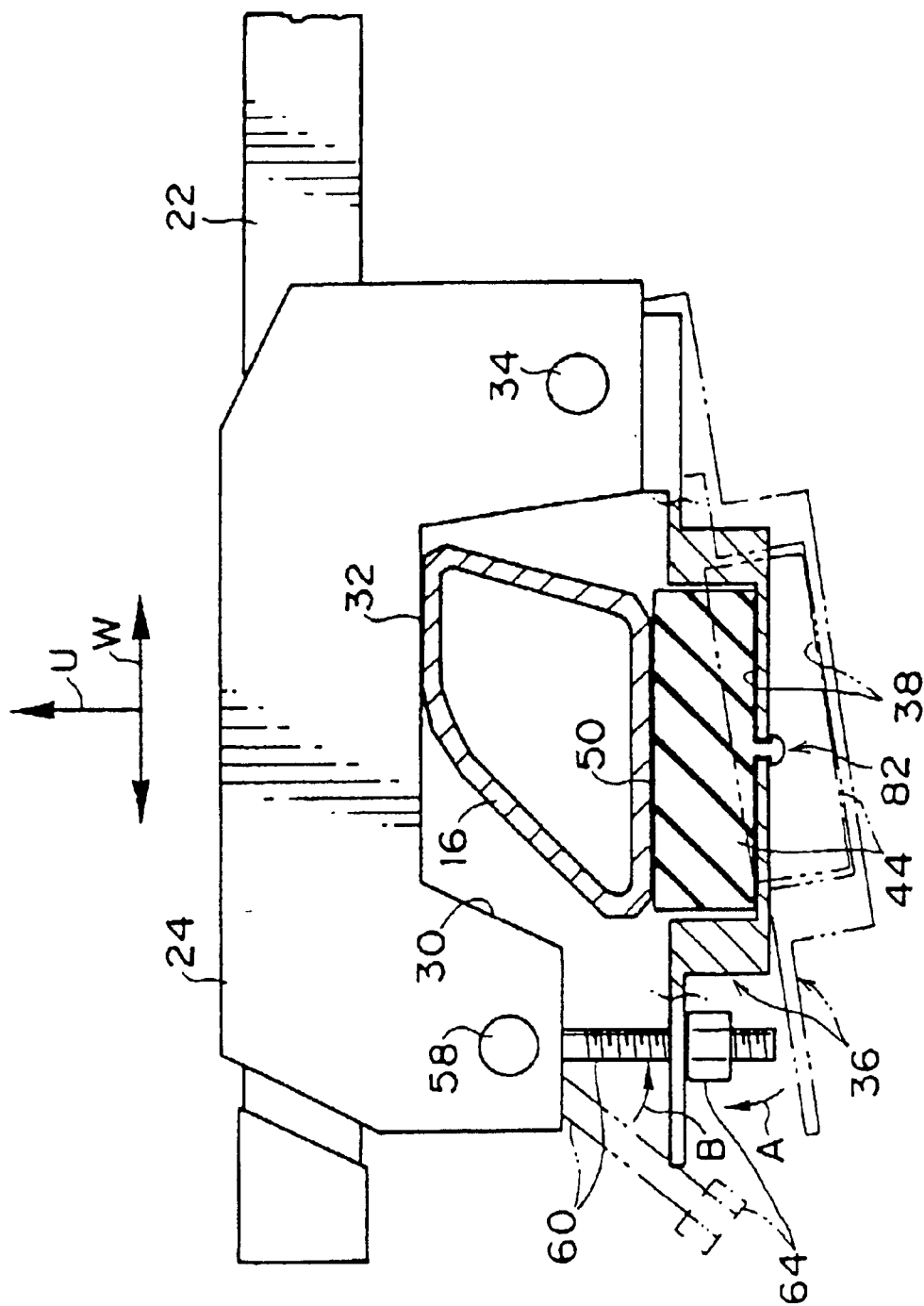

ROOF CARRIER MOUNTING STRUCTURE

This is a division of application Ser. No. 09/456,565, filed Dec. 8, 1999 now U.S. Pat. No. 6,491,192.

BACKGROUND OF THE INVENTION

1. Field of the Invention

The present invention relates to a roof carrier mounting structure for mounting a roof carrier on a member to which a roof carrier is mounted such as a roof rail of a vehicle, a roof panel thereof or the like.

2. Description of the Related Art

FIG. 29 shows an example of a roof carrier mounting structure (a roof baggage supporting device 100) according to the prior art (see Japanese Patent Application Laid-Open (JP-A) No. 7-2025).

The roof baggage supporting device, 100 comprises a lateral beam 102 and a fastening device 104. A side rail 110 is interposed between and fastened by a support jaw 106 and a fastening jaw 108 of the fastening device 104.

However, if sufficient fastening force is to be obtained by this type of structure in which only the side rail 110 is fastened, the size of the fastening device 104 becomes large and the weight thereof is also increased. For example, if a load and the roof baggage supporting device 100 are moved greatly in the longitudinal direction of a vehicle by inertia force generated during the rapid (large) acceleration of the vehicle, the rapid (large) deceleration thereof and the like (which will be collectively referred to below as "a rapid acceleration or deceleration of the vehicle") there is a possibility that the support jaw 106 and the fastening jaw 108 might hit the end of the side rail 110 and be damaged. In order to prevent such damage, it is necessary to set the fastening force of the fastening device 104 at a sufficiently high level. More specifically, in order to reduce the amount of movement of the roof carrier as shown by the arrow J of FIG. 30, the fastening force (fastening torque) needs to be increased. Consequently, the size and weight of the fastening device 104 is further increased.

SUMMARY OF THE INVENTION

In consideration of this, it is an object of the present invention to provide a roof carrier mounting structure capable of reducing the amount of movement of a roof carrier during a large (rapid) acceleration or deceleration of a vehicle with a small fastening force.

A first aspect of the present invention is a roof carrier mounting structure for mounting a roof carrier on a member to which a roof carrier is mounted of a vehicle, comprising: a roof carrier; and an inclined portion formed on the roof carrier and inclined to gradually approach or move away from a member to which a roof carrier is mounted in a longitudinal direction of a vehicle for converting inertia force acting on the vehicle in the longitudinal direction into a fastening force for fastening the roof carrier to the member to which a roof carrier is mounted.

Accordingly, the roof carrier sandwiches the member to which a roof carrier is mounted so that the roof carrier is mounted on the member to which a roof-carrier is mounted. Normally, that is, in the case where; acceleration or a deceleration is not acting on the vehicle or when acceleration or deceleration is acting on the vehicle but has a value equal to or smaller than a predetermined value, the roof carrier reliably sandwiches the member to which a roof carrier is mounted. Consequently, the roof carrier does not move unnecessarily in the longitudinal direction of the vehicle.

The roof carrier is provided with an inclined portion which is inclined to gradually approach or move away from the member to which a roof carrier is mounted in the longitudinal direction of the vehicle. When a large inertia force acts on the roof carrier and the load in the longitudinal direction of the vehicle during a rapid acceleration or deceleration of the vehicle, the inclined portion causes the inertia force in the longitudinal direction of the vehicle to be converted into fastening force with which the roof carrier fastens the member to which a roof carrier is mounted. Consequently, the roof carrier sandwiches the member to which a roof carrier is mounted by a new fastening force generated during the rapid acceleration or deceleration of the vehicle in addition to the original sandwiching force (fastening force). Thus, the sandwiching force (fastening force) with which the roof carrier sandwiches the member to which a roof carrier is mounted is increased during the rapid acceleration or deceleration of the vehicle. Therefore, the resistance to movement of the roof carrier is increased. Consequently, the amount of movement of the roof carrier due to the inertia force is reduced.

Thus, a part of the inertia force acting on the roof carrier and the load during the rapid acceleration or deceleration of the vehicle is utilized to further increase the sandwiching force by which the roof carrier sandwiches the member to which a roof carrier is mounted. Therefore, even if the sandwiching force of the roof carrier itself is small, the amount of movement of the roof carrier can be reduced to a level less than in the prior art during the rapid acceleration or deceleration of the vehicle. Since it is not necessary to increase the sandwiching force of the roof carrier itself, the size and weight of the roof carrier can be reduced.

A second aspect of the present invention is the roof carrier mounting structure according to the first aspect of the present invention, wherein the roof carrier includes: a roof carrier main body; a sandwiching member provided on the roof carrier main body for sandwiching the member to which a roof carrier is mounted between the roof carrier main body and the sandwiching member; and a floating brake mounted on at least one of the roof carrier main body and the sandwiching member such that the floating brake can abut against the member to which a roof carrier is mounted and having at least a portion which abuts against the member to which a roof carrier is mounted able to be elastically deformed, wherein the inclined portion includes: a first inclined face formed on the floating brake which gradually approaches the member to which a roof carrier is mounted the closer to the front of the vehicle; and a second inclined face formed on the floating brake which gradually approaches the member to which a roof carrier is mounted the closer to the rear of the vehicle.

Consequently, in normal conditions, that is, when acceleration or deceleration is not acting on the vehicle or when acceleration or deceleration is acting on the vehicle but has a value equal to or smaller than a predetermined value, the floating brake abuts against the member to which a roof carrier is mounted and both the floating brake and member to which a roof carrier is mounted are sandwiched by the roof carrier main body and sandwiching member. Consequently, at least the portion of the floating brake which is abutting against the member to which a roof carrier is mounted is elastically deformed and attached to the member to which a roof carrier is mounted by pressure. Therefore, the roof carrier does not unnecessarily move relative to the member to which a roof carrier is mounted.

When a large inertia force in the rearward direction of the vehicle acts on the roof carrier and the load during the rapid acceleration of the vehicle, the member (the roof carrier main body or the sandwiching member) to which the floating brake is mounted presses the first inclined face (portion) towards the rear of the vehicle. The first inclined face gradually approaches the member to which a roof carrier is mounted in the forward direction of the vehicle. (the closer to the front of the vehicle.) Therefore, a portion of the force with which the roof carrier main body or the sandwiching member presses against the first inclined face (portion) is converted into a force with which the floating brake presses against the member to which a roof carrier is mounted. Consequently, since the sandwiching force for sandwiching the floating brake and the member to which a roof carrier is mounted is increased, the resistance of the roof carrier to movement is increased, and the amount of movement due to inertia force is reduced.

Similarly, when a large inertia force in the forward direction of the vehicle acts on the roof carrier and the load during the rapid deceleration of the vehicle, the roof carrier main body or the sandwiching member presses the second inclined face (portion) towards the front of the vehicle. The second inclined face gradually approaches the member to which a roof carrier is mounted in the rearward direction of the vehicle. (the closer to the rear of the vehicle.) Therefore, a portion of the force with which the sandwiching member presses against the second inclined portion is converted into a force with which the floating brake presses against the member to which a roof carrier is mounted. Consequently, since the sandwiching force for sandwiching the floating brake and the member to which a roof carrier is mounted is increased, the resistance of the roof carrier to movement is increased and the amount of movement due to inertia force is reduced.

By using a floating brake in which at least the portion abutting against the member to which a roof carrier is mounted can be elastically deformed, the floating brake can be elastically deformed and the member to which a roof carrier is mounted reliably sandwiched between the roof carrier main body and the sandwiching member.

A third aspect of the present invention is the roof carrier mounting structure according to the second aspect of the present invention, wherein a gap for allowing the floating brake to be relatively movable with respect to the sandwiching member is formed between the floating brake and the sandwiching member.

Accordingly, when the sandwiching member presses the first inclined portion or the second inclined portion during a rapid acceleration or deceleration of the vehicle, the floating brake is moved toward the member to which a roof carrier is mounted due to a gap formed between the floating brake and the sandwiching member. Thus, the floating brake is moved towards the member to which a roof carrier is mounted so that a sufficiently large sandwiching force can be obtained.

A fourth aspect of the present invention is the roof carrier mounting structure according to the second aspect or third aspect of the present invention, wherein the sandwiching member includes: a housing portion for housing the floating brake; and an engaging portion provided in the housing portion for engaging with an portion to be engaged provided on the floating brake such that floating brake cannot easily be removed from the housing portion.

Thus, the floating brake is housed in the housing portion provided in the sandwiching member and is attached to the sandwiching member such that the floating brake cannot easily be removed from the housing portion due to the engagement of the engaging portion with the portion to be engaged. Therefore, it is possible to simply perform the assembly of the floating brake in the sandwiching member. During the assembly, moreover, adhering means such as an adhesive is not required.

A fifth aspect of the present invention is the roof carrier mounting structure according to the first aspect of the present invention, wherein the roof carrier includes: a roof carrier main body; a sandwiching member for sandwiching the member to which a roof carrier is mounted between the roof carrier main body and the sandwiching member; and a fixing member for fixing the roof carrier main body and the sandwiching member so as to be relatively movable in the longitudinal direction when acceleration or deceleration having a predetermined value or more acts in the longitudinal direction; wherein the inclined portion includes: a third inclined face formed on the fixing member for causing the sandwiching member to be moved toward the roof carrier main body when the roof carrier main body is moved in a forward direction of the vehicle with respect to the sandwiching member; and a fourth inclined face formed on the fixing member for causing the sandwiching member to be moved toward the roof carrier main body when the roof carrier main body is moved in a rearward direction of the vehicle.

Consequently, in normal conditions, that is, when acceleration or deceleration is not acting on the vehicle or when the acceleration or deceleration is acting on the vehicle but has a value equal to or smaller than a predetermined value, there is no relative movement between the roof carrier main body and the sandwiching member in the longitudinal direction of the vehicle. The member to which a roof carrier is mounted is sandwiched by the roof carrier main body and the sandwiching member. Therefore, the roof carrier does not move unnecessarily relative to the member to which a roof carrier is mounted.

When a large inertia force in the rearward direction of the vehicle acts on the roof carrier and the load during a rapid acceleration of the vehicle so that the roof carrier main body is moved relatively with respect to the sandwiching member in the forward direction of the vehicle, the third inclined face moves the sandwiching member toward the roof carrier main body. Consequently, since the sandwiching force for causing the roof carrier main body and the sandwiching member to sandwich the member to which a roof carrier is mounted increases, the resistance of the roof carrier to movement is increased and the amount of movement due to inertia force is reduced.

Similarly, when a large inertia force in the forward direction of the vehicle acts on the roof carrier and the load during the rapid deceleration of the vehicle so that roof carrier main body is moved relatively with respect to the sandwiching member in the rearward direction of the vehicle, the fourth inclined face move the sandwiching member toward the roof carrier main body. Consequently, since the sandwiching force for causing the roof carrier main body and the sandwiching member to sandwich the member to which a roof carrier is mounted increases, the resistance of the roof carrier to movement is increased and the amount of movement due to inertia force is reduced.

Thus, a portion of the inertia force acting on the load and the roof carrier during the rapid acceleration or deceleration of the vehicle is utilized to move the sandwiching member toward the roof carrier main body. Therefore, even if the original sandwiching force of the roof carrier main body and the sandwiching member is small, the movement of the load and the roof carrier can be further reduced to a level less than in the prior art during the rapid acceleration or deceleration of the vehicle.

In addition, the fixing member on which the third inclined face and the fourth inclined face are formed is simply provided enabling the structure to be kept simple.

BRIEF DESCRIPTION OF THE DRAWINGS

FIG. 2 is a front view showing the roof carrier mounted on the roof rail by means of the roof carrier mounting structure according to the first embodiment of the present invention.

FIG. 9 is a front view showing the roof carrier mounted on the roof rail by means of the roof carrier mounting structure according to the second embodiment of the present invention.

DESCRIPTION OF THE PREFERRED EMBODIMENTS

Figure 1:
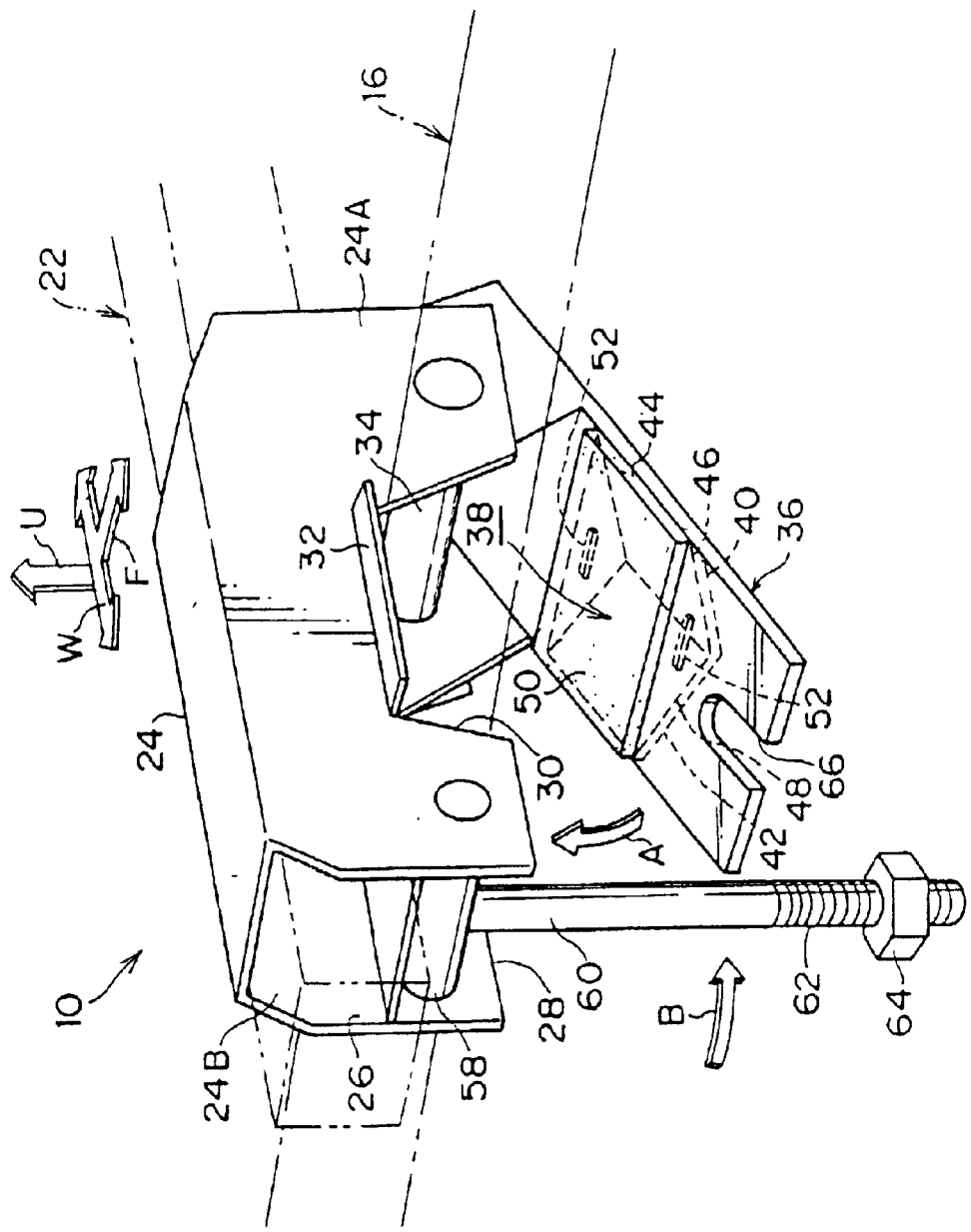
FIG. 1 is a perspective view showing a roof carrier to be mounted on a roof rail by means of a roof carrier mounting structure according to a first embodiment of the present invention.

FIGS. 1 to 3 show the main portions of a roof carrier 10 to be mounted by a roof carrier mounting structure according to a first embodiment of the present invention. In FIG. 4, an automobile 12 having the roof carrier 10 mounted thereon is shown. In the following, as shown in the drawings, the forward direction of a vehicle is indicated by an arrow F, the transverse direction of a vehicle is indicated by an arrow W and the upward direction of a vehicle is indicated by an arrow U. In the following description, "forward direction", "rearward direction", "longitudinal direction" and "transverse direction" mean "the forward direction of the vehicle", "the rearward direction of the vehicle", "the longitudinal direction of the vehicle" and "the transverse direction of the vehicle", respectively.

As shown in FIG. 4, two parallel roof rails 16 are fixed at both ends in the transverse direction of a roof 14 of the automobile 12, running along the longitudinal direction of the vehicle (the direction of the arrow F and a reverse direction thereof). A roof rail leg 18 rising obliquely from the roof 14 is fixed to both ends in the longitudinal direction of the roof rail 16. A predetermined space 20 (see FIG. 3) is formed between the roof rail 16 and the roof 14.

Two load bars 22 are provided in parallel with each other between the pair of roof rails 16. The vicinities of both ends of each load bar 22 are fixed to the roof rail 16 by means of roof carriers 10. In other words, the vehicle 12 according to the present embodiment comprises four roof carriers 10. All four roof carriers 10 have the same structures and the same structured roof carrier 10 can be used at any mounting position, regardless of left or right, front or rear on the roof 14.

As shown in FIGS. 1 to 3, the roof carrier 10 has a casing 24 to be mounted to the vicinities of the both ends of the respective load bars 22. The casing 24 is formed to have an almost box shape, and openings 26 and an opening 28 are formed on both faces in the transverse direction and on the bottom face. The portions in the vicinity of both ends of the load bar 22 are inserted in the openings 26. For example, a loading member 68 onto which baggage may be loaded (see FIG. 3) and the like are fixed between these two load bars 22 provided on the roof 14 in parallel, and baggage can be loaded on the loading member 68. Naturally, the baggage can be fixed directly to the load bars 22.

As shown in FIGS. 1 and 2, an almost trapezoid-shaped notch is formed in an upward direction in a front wall 24A and a rear wall 24B of the casing 24 in an almost central position in the transverse direction in the lower portion of the casing 24, which forms a roof rail housing portion 30. As can be seen in FIG. 2, the roof rail 16 is housed in the roof rail housing portion 30. A flange 32 is formed, extending in the forward direction from the front wall 24A and in the rearward direction from the rear wall 24B, in the upper portion of the roof rail housing portion 30. Thus, the roof rail housing portion 30 is reinforced.

Moreover, a pin 34 is provided suspended between the front wall 24A and the rear wall 24B in a position in the vicinity of the inside of the casing 24 in the transverse direction (the right-hand side position in FIGS. 1 and 2). A clamp 36 is rotatably attached to the pin 34. The clamp 36 is formed in substantially a plate shape so as to cover the opening 28 in the lower face of the casing 24. In addition, the central portion in the transverse direction of the clamp 36 is partially bent (concaved) downward to form a concave housing portion 38.

Figure 3A:
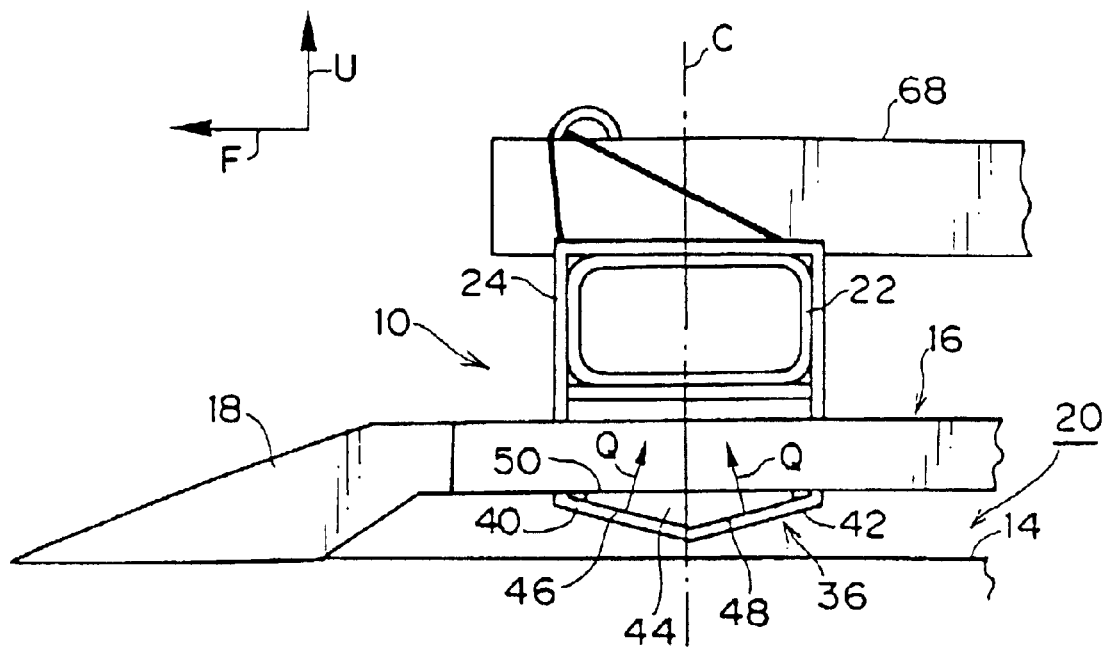
FIG. 3A and FIG. 3B are schematic side views showing the roof carrier mounted on the roof rail by means of the roof carrier mounting structure according to the first embodiment of the present invention, FIG. 3A showing a normal state and FIG. 3B showing the state during a rapid deceleration of a vehicle.
Figure 3B:
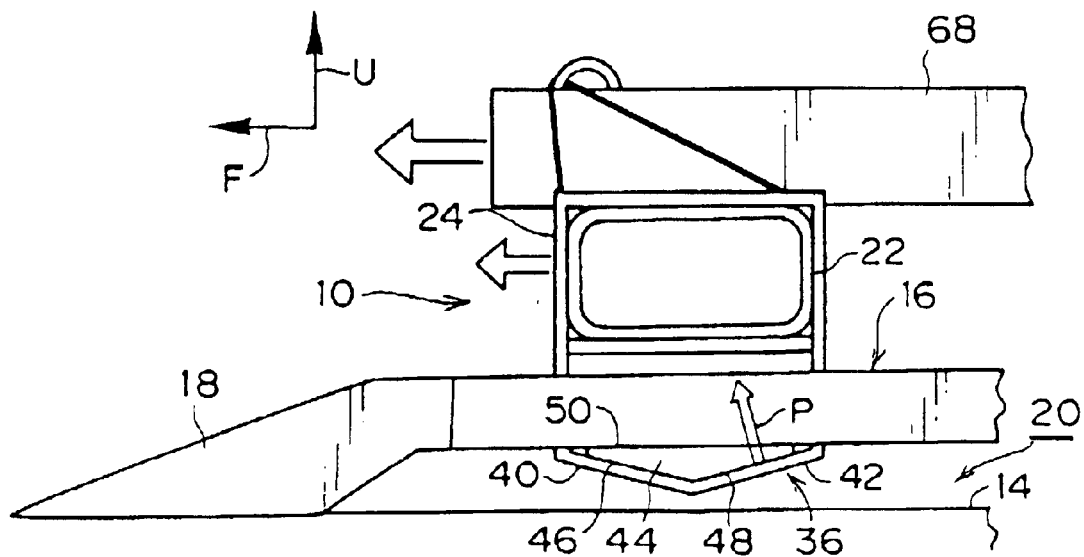
Figure 4:
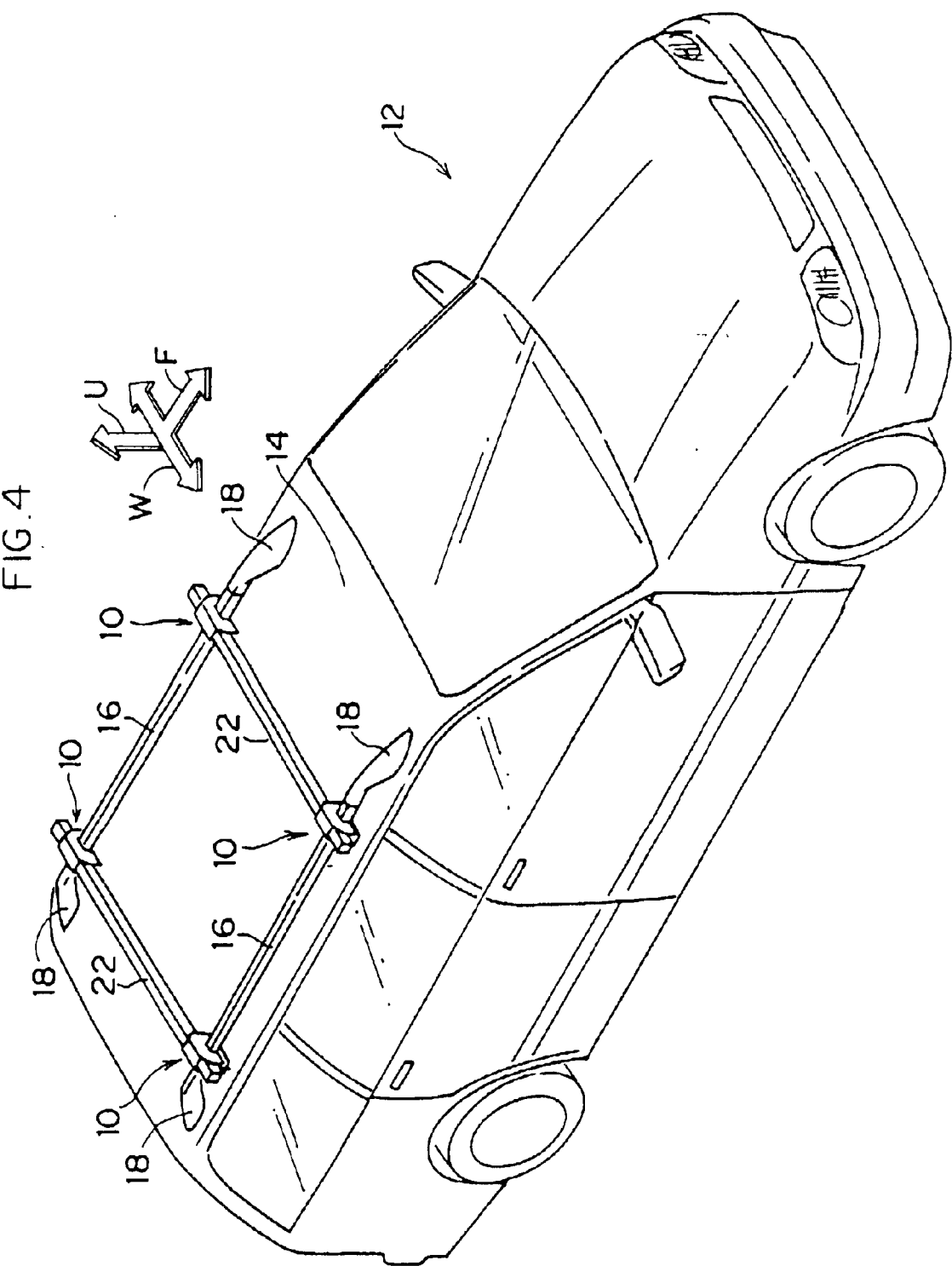
FIG. 4 is a perspective view showing an automobile having the roof carrier mounted thereon by means of the roof carrier mounting structure according to the first embodiment of the present invention.
Figure 5:
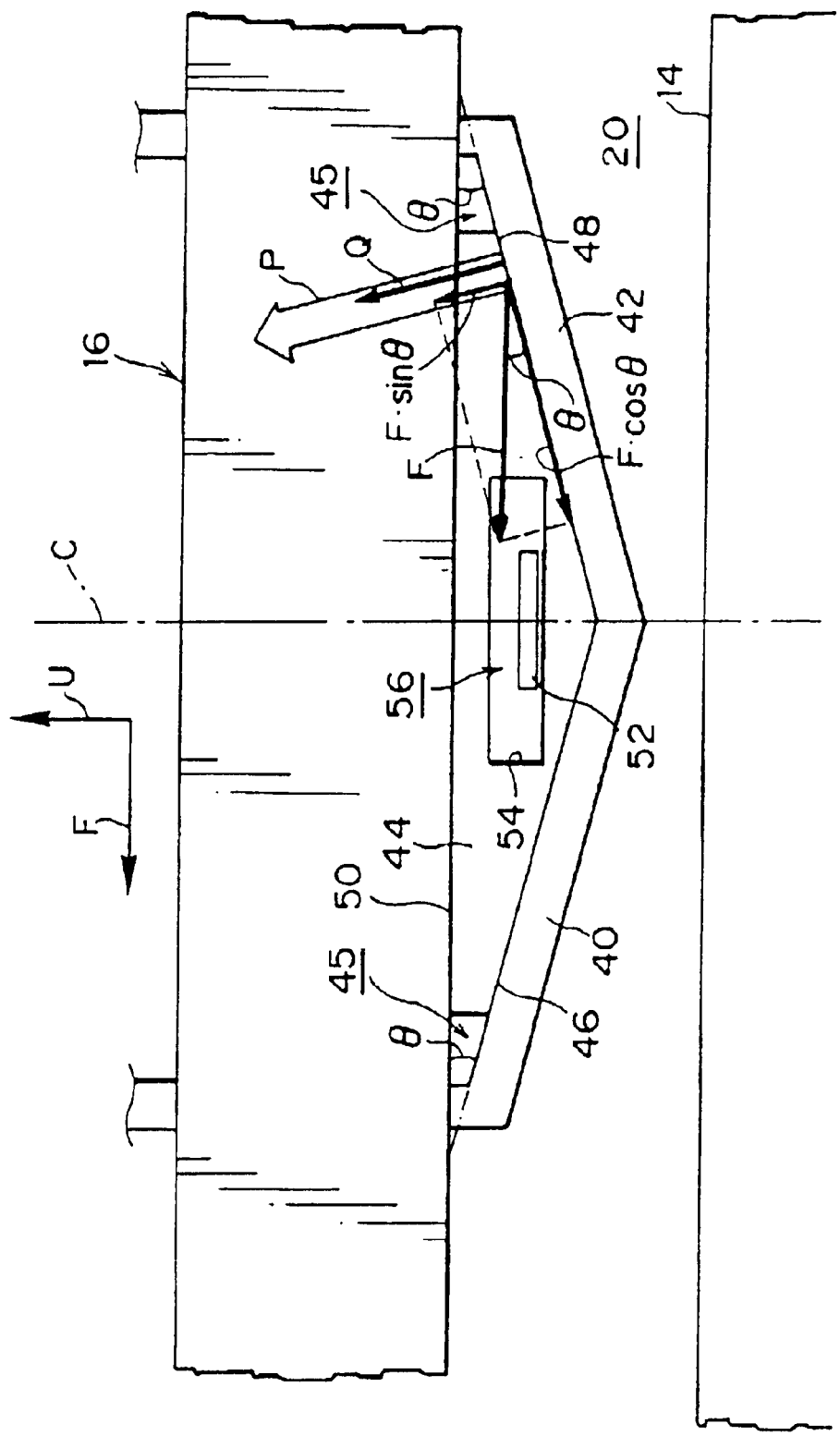
FIG. 5 is a partially enlarged side view showing the roof carrier mounted on the roof rail by means of the roof carrier mounting structure during the rapid deceleration of the vehicle according to the first embodiment of the present invention.

As shown in FIGS. 3A and 3B and FIG. 5, the concave housing portion 38 is formed in a shallow V shape (an inverse isosceles triangle shape) when seen from the side of the vehicle, which corresponds to the shape of a floating brake 44 which will be described below. A forward inclined wall 40 which gradually approaches the roof rail 16 the closer towards the front of the vehicle is formed on the forward side of the center (shown by a center line C) in the longitudinal direction. Similarly, a rearward inclined wall 42 which gradually approaches the roof rail 16 the closer towards the rear of the vehicle is formed on the rearward side of the center in the longitudinal direction. As is apparent from FIGS. 1 and 3A, B, moreover, the sectional shape in the transverse direction of the housing concave portion 38 is identical.

The floating brake 44 made of rubber is housed in the concave housing portion 38. As is apparent from FIG. 3A, the floating brake 44 is formed to have a shallow V shape (an inverse isosceles triangle shape) which is longitudinally symmetrical using the center line C as the symmetry axis as seen from the side of the vehicle, and a forward inclined face 46 which approaches the roof rail 16 the closer to the front of the vehicle is formed on the forward side of the center in the longitudinal direction. The forward inclined face 46 is in contact with the upper face of the forward inclined wall 40 of the concave housing portion 38. Similarly, a rearward inclined face 48 which approaches the roof rail 16 the closer to the rear of the vehicle is formed on the rearward side of the center in the longitudinal direction. The rearward inclined face 48 is in contact with the upper face of the rearward inclined wall 42 of the concave housing portion 38. As shown in FIG. 5, the forward inclined face 46 and rearward inclined face 48 have a predetermined tilt angle θ with respect to the lower face of the roof rail 16.

The longitudinal length of the floating brake 44 is shorter than that of the concave housing portion 38, and a predetermined gaps 45 (see FIG. 5) are formed between the floating brake 44 and the concave housing portion 38. The floating brake 44 can be relatively within moved a constant range in the longitudinal direction of the concave housing portion 38 and the vertical direction of the vehicle due to the gap 45 and a gap 56 which will be described below.

Moreover, the upper face of the floating brake 44 is formed like a plane, and acts as a contact face 50 which comes in contact with the lower face of the roof rail 16. As shown in FIG. 1 (shown in a two-dot chain line also in FIG. 2), the upper portion of the floating brake 44 projects upward from the concave housing portion 38 in the state in which the roof carrier is not mounted on the roof rail 16, and the contact face 50 of the floating brake 44 is pressed against the lower face of the roof rail 16 and the floating brake 44 is elastically compressed in the vertical direction in the state in which the roof carrier is mounted on the roof rail 16. Therefore, the amount of the projection of the floating brake 44 from the concave housing portion 38 is reduced. As is apparent from FIG. 1 and FIGS. 3A, B, the sectional shape in the transverse direction of the floating brake 44 is identical.

Both side faces in the transverse direction of the floating brake 44 are formed in parallel with each other in the longitudinal direction. A block-shaped engaging piece 52 projects from each side face. On the other hand, a concave engaging portion 54 is formed corresponding to the engaging piece 52 on both side faces in the transverse direction of the concave housing portion 38. For this reason, the engaging piece 52 can be housed in the concave engaging portion 54 by elastically deforming the floating brake 44. After the housing of the engaging piece 52 in the engaging concave portion 54 has been completed, the engaging-piece 52 and the concave engaging portion 54 are engaged with each other by the elastic restoration of the floating brake 44. As described above, the floating brake 44 can easily be assembled into the concave housing portion 38. Moreover, the floating brake 44 is not inadvertently separated from the concave housing portion 38. Furthermore, an adhesive or the like is not required for the assembly.

As is apparent from FIGS. 2 and 5, moreover, the concave engaging portion 54 has a length in the longitudinal direction of the vehicle which is greater than the length in the longitudinal direction of the engaging piece 52 by a predetermined amount, and has a height in the vertical direction of the vehicle which is greater than the height in the vertical direction of the engaging piece 52 by a predetermined amount. A predetermined gap 56 is formed on both left and right sides in the longitudinal direction and in the upper portion between the engaging piece 52 and the concave engaging portion 54 and between the upper portion of the engaging piece 52 and an upper inner wall of the concave engaging portion 54 in the vertical direction of the vehicle. By the gap 56, the floating brake 44 can move relatively with respect to the housing concave portion 38 within a constant range.

As shown in FIGS. 1 and 2, a pin 58 is rotatably suspended between the front wall 24A and the rear wall 24B at a position in the vicinity of the outside of the casing 24 in the transverse direction. A bolt 60 projects outwards in a radial direction from the pin 58. A male screw thread is formed on the bolt 60 in the vicinity of the tip thereof, and a nut 64 is screwed onto the male screw thread 62.

As shown in FIG. 2, when the clamp 36 is rotated in the direction in which the floating brake 44 comes into contact with the roof rail 16 (the direction indicated by the arrow A), and the bolt 60 is rotated around the pin 58 in the direction in which the bolt 60 approaches the roof rail 16 (the direction indicated by the arrow B), the bolt 60 can be housed inside a housing hole 66 (see FIG. 1) formed in the distal end of the clamp 36. The clamp 36 is supported on both sides in the transverse direction by the pin 34 on one side and the nut 64 on the other (a so-called double-cantilever type) When the nut 64 is fastened in this state, the clamp 36 is rotated by the nut 64 in the direction of the arrow A so that the floating brake 44 is firmly pressed against the roof rail 16. Consequently, the floating brake 44 is pressed in close contact with the roof rail 16 by a predetermined fastening force Q (see FIGS. 3A and 5) between the roof rail housing portion 30 and the concave housing portion 38.

Figure 6:
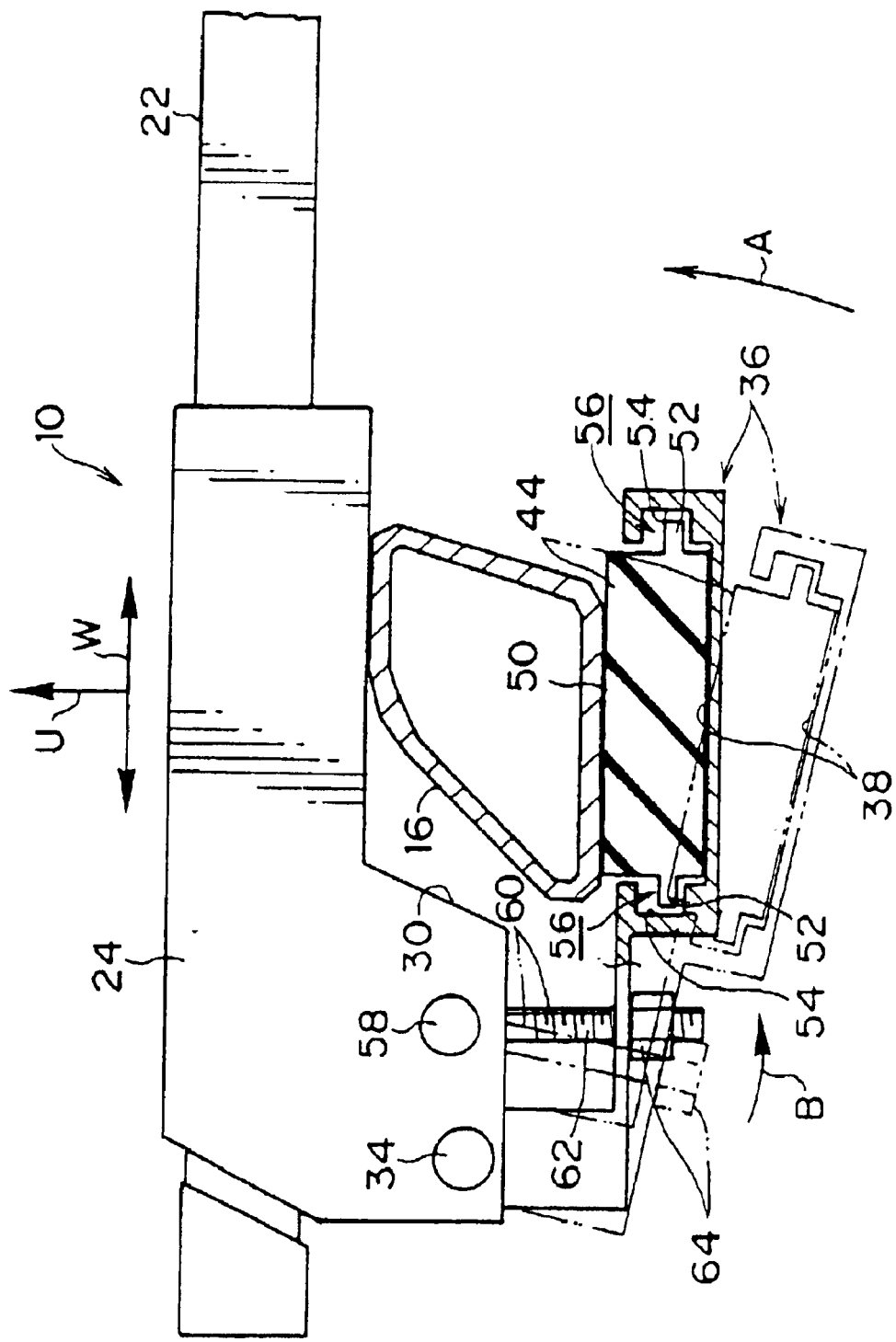
FIG. 6 is a front view showing a cantilever type roof carrier mounted on the roof rail by means of the roof carrier mounting structure according to the first embodiment of the present invention.

In the roof carrier 10 according to the first embodiment, a so-called cantilever type can be used in addition to the above-mentioned double-cantilever type. More specifically, as shown in FIG. 6, the clamp 36 is rotatably supported by the pin 34 at an outwards position in the transverse direction (towards the left in FIG. 6), and the bolt 60 is inserted in a housing hole formed on the clamp 36 in a position between the pin 34 and the roof rail housing portion 30. By fastening the nut 64, the floating brake 44 may be caused to come in close contact with the roof rail 16 between the roof rail housing portion 30 and the concave housing portion 38.

Next, a description will be given of a method for mounting the roof carrier 10 on the roof rail 16 by means of the roof carrier mounting structure according to the present embodiment and the operation of the roof carrier mounting structure.

In order to mount the roof carrier 10 on the roof rail 16, first of all, the clamp 36 is rotated in the opposite direction to the arrow A in the state in which the bolt 60 is not housed in the housing hole 66 as shown in FIG. 1 (shown in a two-dot chain line also in FIG. 2), thereby forming a sufficient gap between the floating brake 44 and the roof rail housing portion 30. Next, the casing 24 and the clamp 36 are provided in predetermined positions with respect to the roof rail 16 such that the roof rail 16 is positioned in the roof rail housing portion 30 and the floating brake 44 is positioned in the gap 20 (see FIG. 3) between the roof 14 and the roof rail 16.

As shown by a solid line in FIG. 2, next, the clamp 36 is rotated in the direction of the arrow A to cause the contact face 50 of the floating brake 44 to come in contact with the lower face of the roof rail 16 and the bolt 60 is rotated in the direction of the arrow B and is then housed in the housing hole 66. When the nut 64 is gradually screwed tight in this state, the clamp 36 is pushed upward by the nut 64 and is further rotated in the direction of the arrow A. The floating brake 44 is the elastically deformed and the contact face 50 is strongly pressed against the lower face of the roof rail 16 by pressure. As shown in FIGS. 3A and 5, consequently, each fastening force Q which is vertical respectively relative to the forward inclined wall 40 and rearward inclined wall 42 of the housing concave portion 38 acts on the floating brake 44 therefrom. Consequently, the floating brake 44 is pressed in close contact with the roof rail 16 between the roof rail housing portion 30 and the concave housing portion 38. Therefore, the roof carrier 10 does not move in the longitudinal direction with respect to the roof rail 16.

When acceleration or deceleration which is equal to or greater than a predetermined value acts on the vehicle, a large inertia force acts on the roof carrier 10. When the inertia force is smaller than a frictional force acting on the floating brake 44 and the roof rail 16 due to the above-mentioned fastening force Q, the roof carrier 10 does not move relative to the roof rail 16. On the other hand, when the inertia force is greater than the frictional force, the roof carrier 10 tries to move relative to the vehicle (roof rail 16) in the direction of the inertia force. However, in this case, in the roof carrier mounting structure according to the present embodiment, the amount of movement of the roof carrier 10 relative to the vehicle is less than the same relative movement the conventional roof carrier mounting structure. A detailed description will be given of this point.

For example, when a large inertia force acts on the roof carrier 10 in the forward direction during a large (rapid) deceleration of the vehicle as shown in FIG. 3B, the casing 24 and the clamp 36 try to move inertially in the forward direction as a single body because the clamp 36 is attached to the casing 24. As shown in FIG. 5, a forward pressing force F acts on the rearward inclined face 48 of the floating brake 44 from the rearward inclined wall 42 of the clamp 36. The rearward inclined wall 42 is inclined at the predetermined tilt angle θ with respect to the lower face of the roof rail 16. In addition, the floating brake 44 can be moved in the longitudinal direction with respect to the clamp 36. Therefore, the pressing force F is divided into a vertical component F·sin (θ) and a horizontal component F·cos (θ) on the rearward inclined face 48. The vertical component F·sin (θ) acts as force for pressing the floating brake 44 against the roof rail 16. As a result, anew fastening force F·sin (θ) acts in addition to the fastening force Q in the normal state (in which acceleration or deceleration that is equal to or greater than a predetermined value is not acting on the vehicle). Consequently, the whole fastening force becomes larger than the fastening force Q in the normal state as shown by the arrow P in FIG. 5. For this reason, the roof carrier 10 is firmly fixed to the roof rail 16. Consequently, even if the inertia force acts on the roof carrier 10, the amount of forward relative movement for the roof rail 16 is reduced.

As is apparent from the above description, furthermore, the component F·sin (θ) of the pressing force acting as a new fastening force during the rapid deceleration of the vehicle is increased in proportion to the inertia force. More specifically, the greater the inertial force, the greater the overall fastening force. Consequently, the amount of relative movement of the roof carrier 10 with respect to the roof rail 16 can be reduced effectively.

While the description has been given by using the rapid deceleration of the vehicle as an example, the rearward inertia force acts as the rearward pressing force F on the forward inclined face 46 of the floating brake 44 from the forward inclined wall 40 of the clamp 36, and the component F·sin (θ) of the pressing force F which is vertical to the forward inclined face 46 is applied as the force for pressing the floating brake 44 against the roof rail 16 during rapid acceleration of the vehicle. Consequently, the overall fastening force is larger than the fastening force Q in the normal state, in the same manner as during the rapid deceleration of the vehicle. Thus, the amount of rearward relative movement of the roof carrier 10 with respect to the roof rail 16 is reduced.

Figure 7:
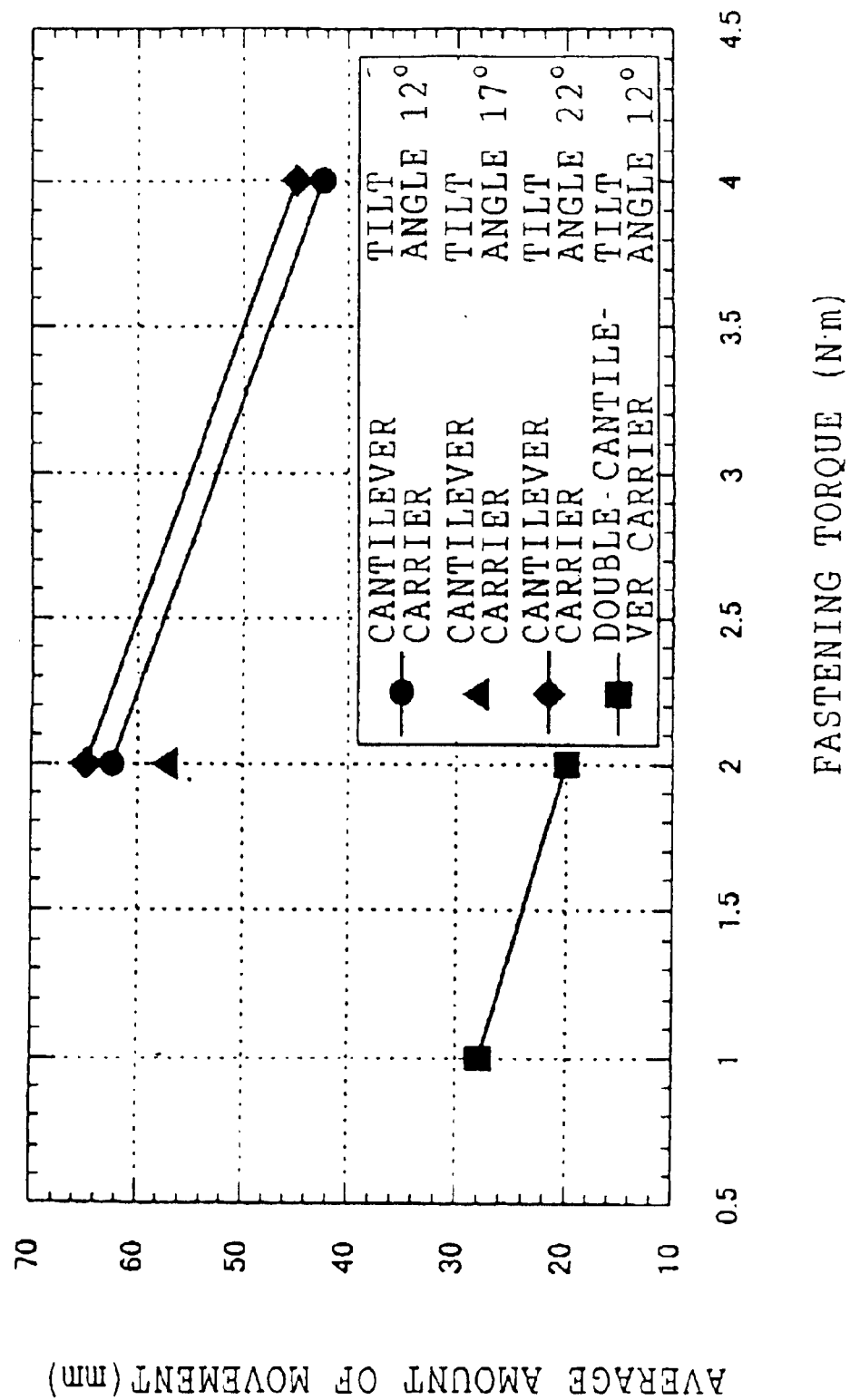
FIG. 7 is a graph showing the relationship between the average amount of maximum movement of the roof carrier relative to the roof rail and the fastening torque using the roof carrier mounting structure according to the first embodiment of the present invention.

FIG. 7 shows the relationship between the fastening torque and the average amount of maximum movement of the roof carrier which are measured by changing the value of the tilt angle θ for the double-cantilever type roof carrier and the cantilever type roof carrier in the roof carrier mounting structure according to the present invention. The "average amount of maximum movement" represents the average "amount of maximum movement" for the four roof carriers 10 mounted on the roof rail 16 with respect to the roof rail 16 during the rapid deceleration (or the rapid acceleration) of the vehicle. Moreover, the amount of movement of the roof carrier 10 relative to the roof rail 16 is at temporary maximum directly after the rapid deceleration of the vehicle. Then, the roof carrier 10 slightly returns towards its initial position. Therefore, the amount of relative movement decreases, then the relative movement stops. The term "amount of maximum movement" represents the amount of relative movement which is at temporary maximum directly after the rapid deceleration of the vehicle. Hereinafter, the term "amount of movement" will be used to mean the "average amount of maximum movement".

Moreover, the roof carrier 10 according to the present embodiment has a structure in which the clamp 36 is rotated around the pin 34 to fasten the floating brake 44 to the roof rail 16. In the graph of FIG. 7, the axis of abscissa indicates the fastening torque. The fastening torque is proportional to the fastening force for fastening the floating brake 44 to the roof rail 16.

As is apparent from the graph, in the roof carrier mounting structure according to the present embodiment, although there is a difference between the amounts of movement in the double-cantilever type and the cantilever type, no matter what type or tilt angle, the amount of movement can be set to 70 mm or less.

In the case of the cantilever type, moreover, it is apparent that the amount of movement is the smallest with the tilt angle θ=17° and is sequentially reduced in order of: tilt angle θ=12° and tilt angle θ=22°.

In order to reduce the amount of movement, it is preferable that the condition of the tilt angle θ should have the following range.

$$5° \leq \theta \leq 45° \tag{1}$$

More specifically, if θ is equal to or greater than 5°, the floating brake 44 can keep a predetermined thickness. Therefore, the floating brake 44 can be sufficiently elastically deformed in the direction of that thickness (the vertical direction). Moreover, if θ is set to 45° or less, the vertical component F·sin (θ) mentioned above of the inertia force F is greater than the horizontal component F·cos (θ) mentioned above. Therefore, the effect of increasing the fastening force is greater.

As matter of course, the tilt angle θ is not restricted to the range of the above-mentioned equation (1). More specifically, the roof carrier mounting structure according to the present embodiment can reduce the amount of movement of the roof carrier 10 with a smaller fastening torque than in the prior art. Therefore, the tilt angle θ can properly be set corresponding to the shape and the location where the roof carrier 10 is to be mounted. For example, by reducing the tilt angle θ and decreasing the thickness of the floating brake 44, the roof carrier 10 can be mounted to the roof rail 16 even when the gap 20 between the roof 14 and the roof rails 16 is narrow but a sufficient fastening force can still be obtained.

In addition, the amount of movement differs depending on whether a double-cantilever type or a cantilever type is used and on the value of the tilt angle θ. However, if the type and tilt angle θ are the same, then the changes in the amount of movement during a rapid acceleration or deceleration of the vehicle are little affected by changes in the fastening torque. In other words, almost the same effect can be obtained irrespective of the fastening torque.

In this way, the roof carrier mounting structure according to the first embodiment enables the amount of movement by the roof carrier 10 to be reduced to less than in the prior art during the rapid acceleration and deceleration of the vehicle even when the fastening force (fastening torque) is small. Namely, in a conventional roof carrier mounting structure, after taking into consideration the costs, weight, and ease of mounting, it was found necessary from a structural standpoint (as is shown in by the ● in FIG. 3) to increase the fastening torque in order to reduce the amount of movement of the roof carrier 10 during a rapid acceleration or deceleration of the vehicle (see arrow J on the graph). On the other hand, in the roof carrier mounting structure according to the present embodiment, the amount of movement of the roof carrier 10 can be reduced to less than in the prior art with a small fastening torque (fastening force) as shown by "★" (the plots on the graph move in the direction shown by the outlined arrow K).

Figure 8:
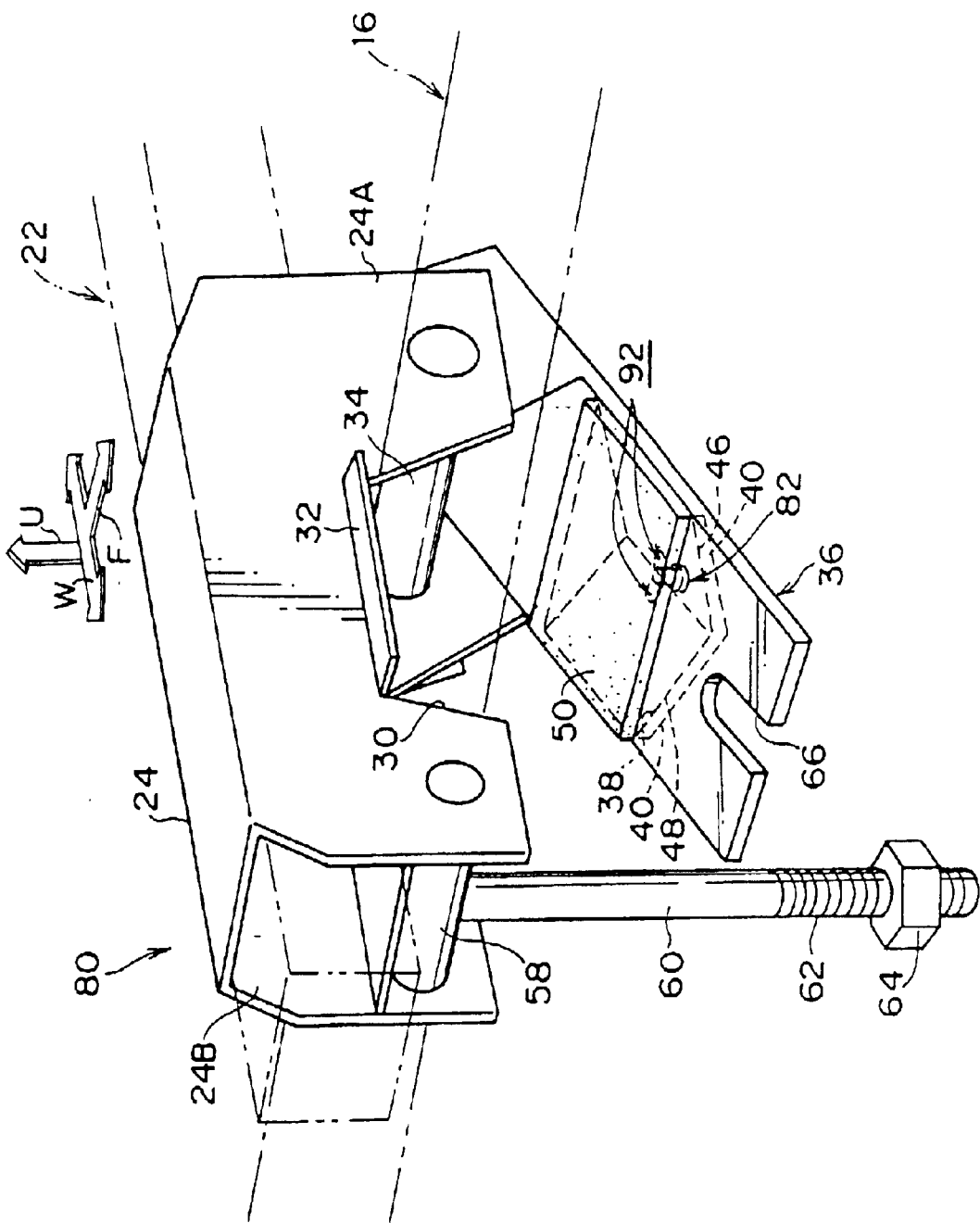
FIG. 8 is a perspective view showing a roof carrier to be mounted on a roof rail by means of a roof carrier mounting structure according to a second embodiment of the present invention.
Figure 10A:
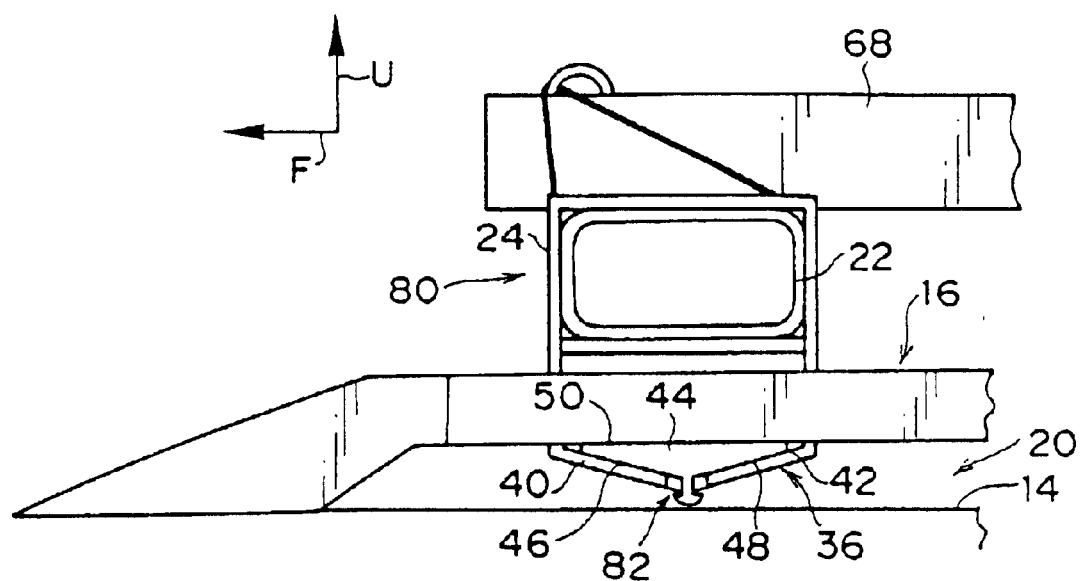
FIG. 10A is a schematic side view showing the roof carrier mounted on the roof rail by means of the roof carrier mounting structure according to the second embodiment of the present invention.
Figure 10B:
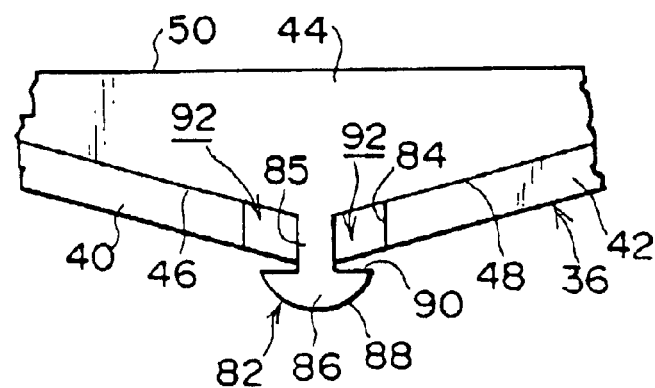
FIG. 10B is a partially enlarged side view showing the roof carrier during the rapid deceleration of a vehicle.

FIGS. 8 to 10 show a roof carrier 80 according to a second embodiment of the present invention. As compared with the roof carrier 10 according to the first embodiment, this roof carrier 10 uses a different structure for assembling the floating brake 44 in the concave housing portion 38. The same components, members and the like as those in the first embodiment have the same reference numerals and their description will be omitted.

In the roof carrier 80, the engaging piece 52 and the concave engaging portion 54 of the first embodiment are not formed in the floating brake 44 and the concave housing portion 38. Instead, an engaging projection 82 and a slot 84 are formed in the floating brake 44 and the housing concave portion 38, respectively.

The engaging projection 82 projects downward from the center in the transverse direction of the bottom edge of the floating brake 44, and is formed from a cylinder portion 85 formed in a cylindrical shape and a large diameter portion 86 having a diameter partially increased on a tip (the lower end) of the cylinder portions. A semispherical face 88 is formed on the tip side (lower end side) of the large diameter portion 86, and an engaging face 90, perpendicular to the cylindrical portion 85, is formed on the rear end side (upper end side) of the large diameter portion 88.

The slot 84 is formed in a position corresponding to the engaging projection 82, that is, the center in the transverse direction of the lower end of the concave housing portion 38 such that the longitudinal direction thereof is coincident with the forward-rearward direction of the vehicle. The slot 84 has a predetermined width which is smaller than the diameter of the engaging face 90 of the large diameter portion 86 of the engaging projection 82, and slightly larger than the diameter of the cylindrical portion 85.

In the roof carrier 80, when the floating brake 44 is to be assembled in the concave housing portion 38, the large diameter portion 86 of the engaging projection 82 is pushed against the slot 84. As the floating brake 44 is gradually pushed in, the semispherical face 88 of the large diameter portion 86 is pressed against the hole wall of the slot 84, namely, the diameter of the large diameter portion 86 is elastically reduced, and the large diameter portion 86 passes through the lower face of the concave housing portion 38 by penetrating the slot 84. In this state, the large diameter portion 86 reverts elastically to its previous condition. Therefore, even if a force acts on the engaging projection 82 to the direction in which the engaging projection is extracted (upward), the engaging face 90 comes into contact with the wall surface (the lower surface of the concave housing portion 38) around the slot 84 so that the engaging projection 82 is not extracted from the slot 84. Consequently, the state in which the floating brake 44 is housed in the housing concave portion 38 is kept.

In this state, moreover, a predetermined gap 92 is formed in the longitudinal direction between the cylindrical portion 85 of the engaging projection 82 and the slot 84 as shown in FIG. 10. Due to the gap 92 and a gap 45 formed between the floating brake 44 and the concave housing portion 38, the floating brake 44 can be moved in the longitudinal direction with respect to the concave housing portion 38. Since the floating brake 44 can thus move in the longitudinal direction, it can move toward and along the roof rail 16 when the inclined face of the floating brake 44 (a forward inclined face 46 or a rearward inclined face 48) is pushed from the inclined wall of the housing concave portion 38 (a forward inclined wall 40 or a rearward inclined wall 42). Consequently, the floating brake 44 is firmly pressed against the roof rail 16 by the pressure so that the fastening force is increased.

In this way, in the roof carrier 80 according to the second embodiment, the floating brake 44 can easily be assembled with the concave housing portion 38 simply by pushing the engaging projection 82 against the slot 84.

In the same manner as in the roof carrier 10 according to the first embodiment, moreover, the floating brake 44 is pushed more firmly against the roof rail 16 and held thereon by utilizing a part of the inertia force acting on the roof carrier 80 during the rapid acceleration and deceleration of the vehicle. Therefore, the amount of movement of the roof carrier 80 can be reduced.

Figure 12:
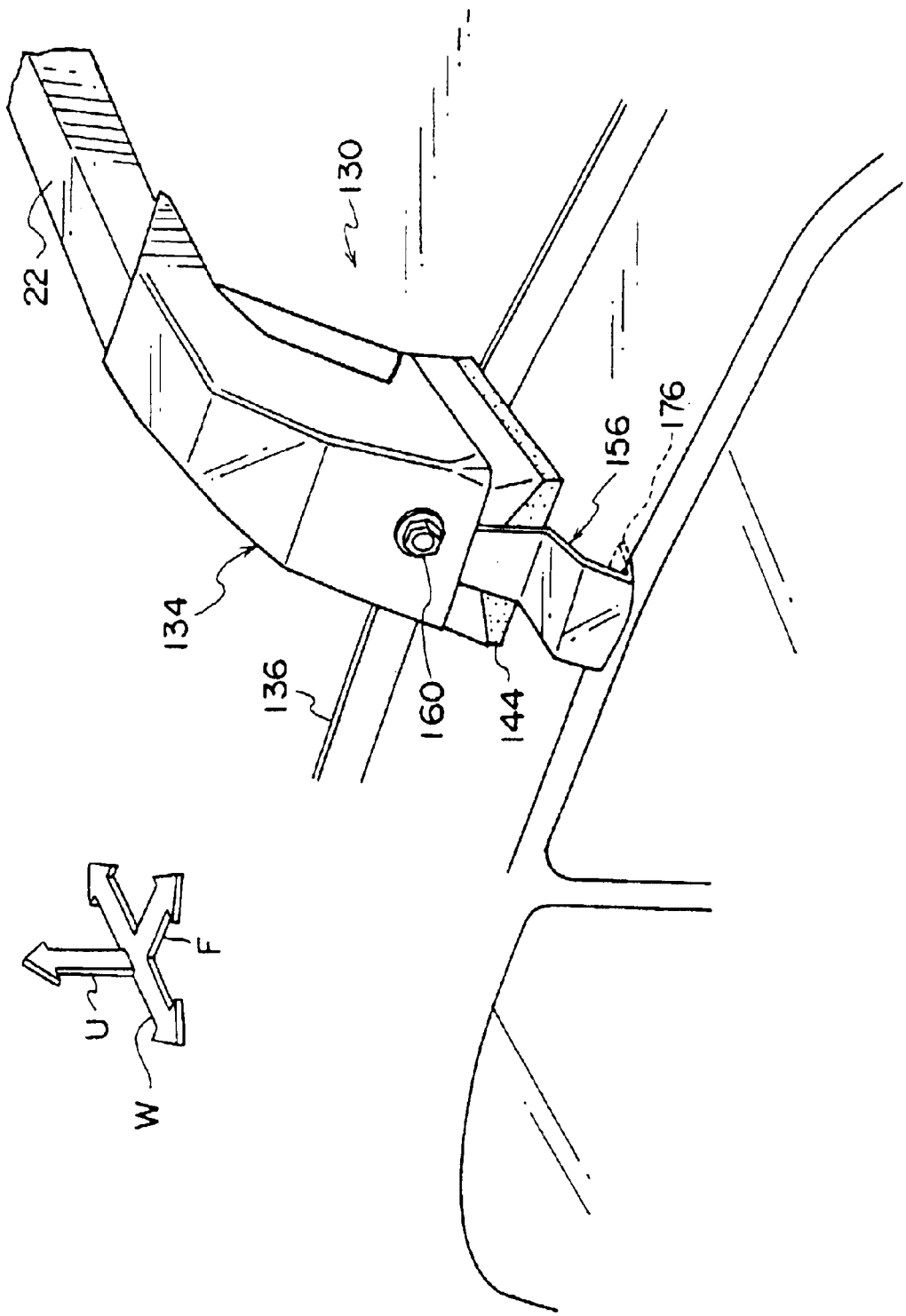
FIG. 12 is a perspective view showing a roof carrier mounted on a roof panel by means of a roof carrier mounting structure according to a third embodiment of the present invention.
Figure 13:
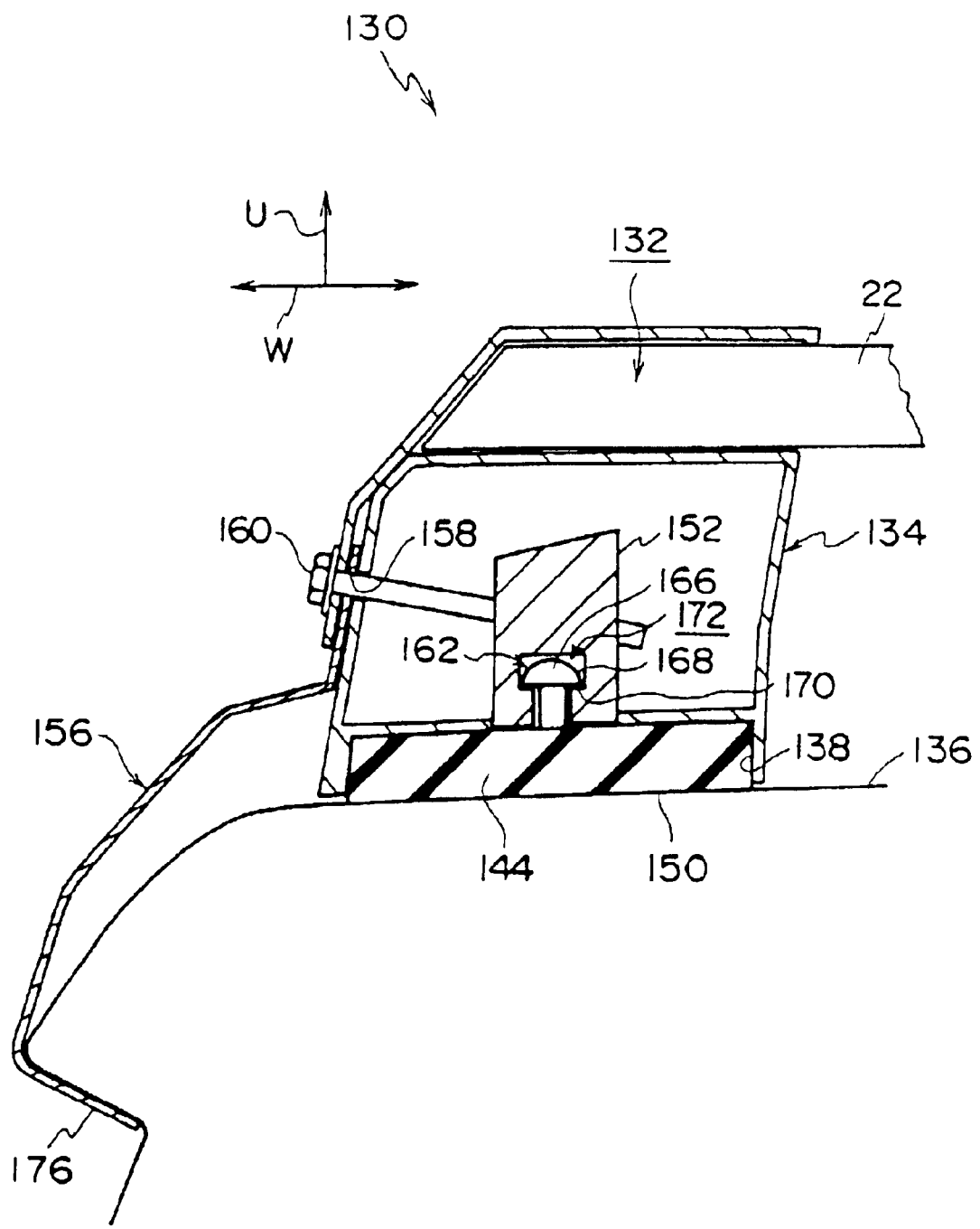
FIG. 13 is a sectional view showing the roof carrier mounted on the roof panel by means of the roof carrier mounting structure according to the third embodiment of the present invention.
Figure 14:
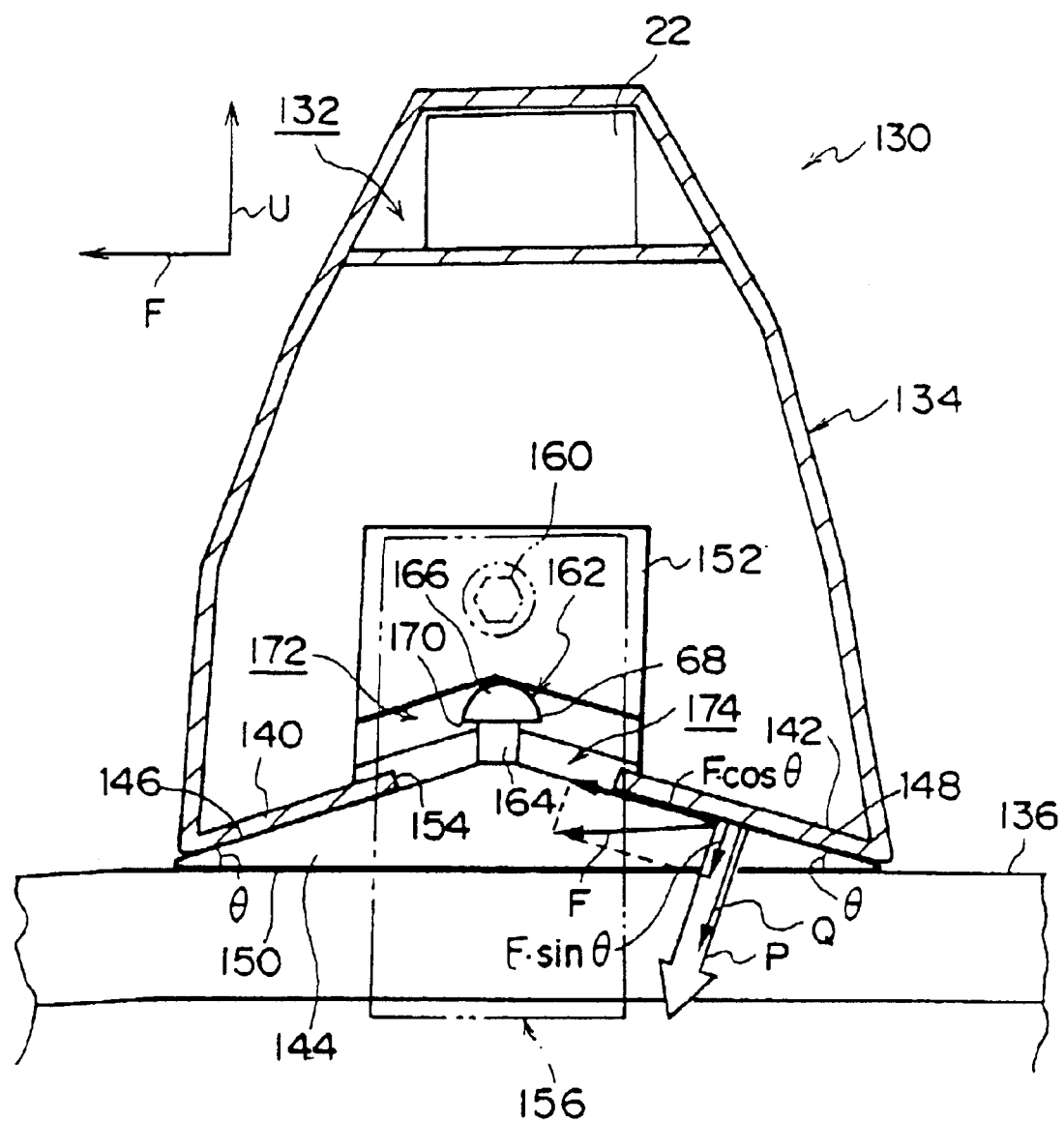
FIG. 14 is a schematic side view showing the roof carrier mounted on the roof panel by means of the roof carrier mounting structure according to the third embodiment of the present invention.

FIGS. 12 to 14 show a roof carrier 130 according to a third embodiment of the present invention. The roof carrier 130 can be directly fixed to the roof panel 136 of an automobile to which no roof rail is attached (the automobile body itself is not shown in FIGS. 12 to 14). The same components, members and the like as those in the roof carrier 10 according to the first embodiment have the same reference numerals and their description will be omitted.

In the roof carrier 130, a load bar housing portion 132 open toward the center of the vehicle in the transverse direction is formed in the upper portion of a casing 134 formed substantially in a box shape as shown in FIGS. 13 and 14. The end of the load bar 22 is housed and held in (fixed to) the load bar housing portion 132.

As shown in FIG. 14, the bottom wall of the casing 134 comprises a forward inclined wall 140 on the forward side of the center thereof in the longitudinal direction which gradually approaches the roof panel 136 the closer to the front of the vehicle, and a rearward inclined wall 142 on the rearward sides of the center thereof in the longitudinal direction which gradually approaches the roof panel 136 the closer to the rear of the vehicle. Moreover, a slot 154 whose longitudinal direction is aligned in the forward-rearward direction of the vehicle is formed in the center of the bottom wall in the transverse direction of the casing 134. An engaging projection 162 which will be described below is inserted in the slot 154.

A concave housing portion 138 is provided below the bottom wall of the casing 134, and a floating brake 144 is housed in the concave housing portion 138. As shown in FIG. 14, the floating brake 144 is formed substantially in an inverted shallow V shape (an upright isosceles triangle shape) when seen from the side. The forward inclined face 146 comes in contact with the lower face of the forward inclined wall 140, and the rearward inclined face 148 comes in contact with the lower face of the rearward inclined wall 142. These forward and rearward inclined faces 146 and 148 form a predetermined tilt angle θ with the upper face of the roof panel 136. Moreover, the lower portion of the floating brake 144 bulges out slightly downwards from the lower end of the casing 134 (see FIG. 12). The bottom face of the floating brake 144 is a contact face 150 formed in a planar shape, and the contact face 150 comes in contact with the roof panel 136 in the state in which the roof carrier 130 is mounted.

The engaging projection 162 projects upward from the center in the transverse direction of the upper end of the floating brake 144. The engaging projection 162 is formed from a cylinder portion 164 formed in a cylinder shape and a large diameter portion 166 having a diameter partially increased at a tip (the upper end) thereof in the same manner as the engaging projection 82 according to the second embodiment. A semispherical face 168 and an engaging face 170 are formed in the large diameter portion 166. By that the large diameter portion 166 is pushed against the slot 154 and the lower end of a holding block 152 which will be described below, the large diameter portion 166 can be inserted in the due to an elastic reduction in the diameter thereof. After the insertion, the large diameter portion 166 is housed in the projection concave housing portion 172 formed in the holding block 152 and elastically reverts to its original state. Consequently, the engaging face 170 hits the wall face of the projection concave housing portion 172. Therefore, the engaging projection 162 is not inadvertently removed. In this state, moreover, a predetermined gap 174 is formed between the cylindrical portion 164, the slot 154, and projection concave housing portion 172, and the floating brake 144 can be moved in the longitudinal direction with respect to the casing 134.

The holding block 152 stands upright from the center of the bottom wall of the casing 134, and is provided inside the casing 134. As illustrated in detail in FIG. 13, the bolt 160 is bolted to the holding block 152 such that its head portion faces outward in the transverse direction (to the left side in FIG. 13). Moreover, the bolt 160 is inserted in an insertion hole 158 formed in the vicinity of the upper end of a clamp 156.

The clamp 156 is formed substantially in a plate shape, and is bent at a predetermined position so as to match the shape of the roof panel 136. In particular, the lower end of the clamp 156 is a hook piece 176 which is bent toward the inside of the vehicle in the transverse direction. The hook piece 176 is engaged with the end of the roof panel 136 in the transverse direction thereof. When the bolt 160 is fastened in the engagement state, the roof panel 136 is sandwiched between the hook piece 176 of the clamp 156 and the contact face 150 of the floating brake 144.

Also in the roof carrier 130 according to the third embodiment which has the above structure, the force F·sin (θ) component of the inertia force F acts as the force for pushing the floating brake 144 against the roof panel 136 in addition to the fastening force Q which acts in the normal state, during the rapid acceleration and deceleration of the vehicle, in the same manner as in the roof carrier 10 according to the first embodiment and the roof carrier 80 according to the second embodiment. Consequently, even if the inertia force F acts on the roof carrier 130, the amount of relative movement in the longitudinal direction of the roof carrier 130 in relation to the roof panel 136 is reduced.

Figure 15:
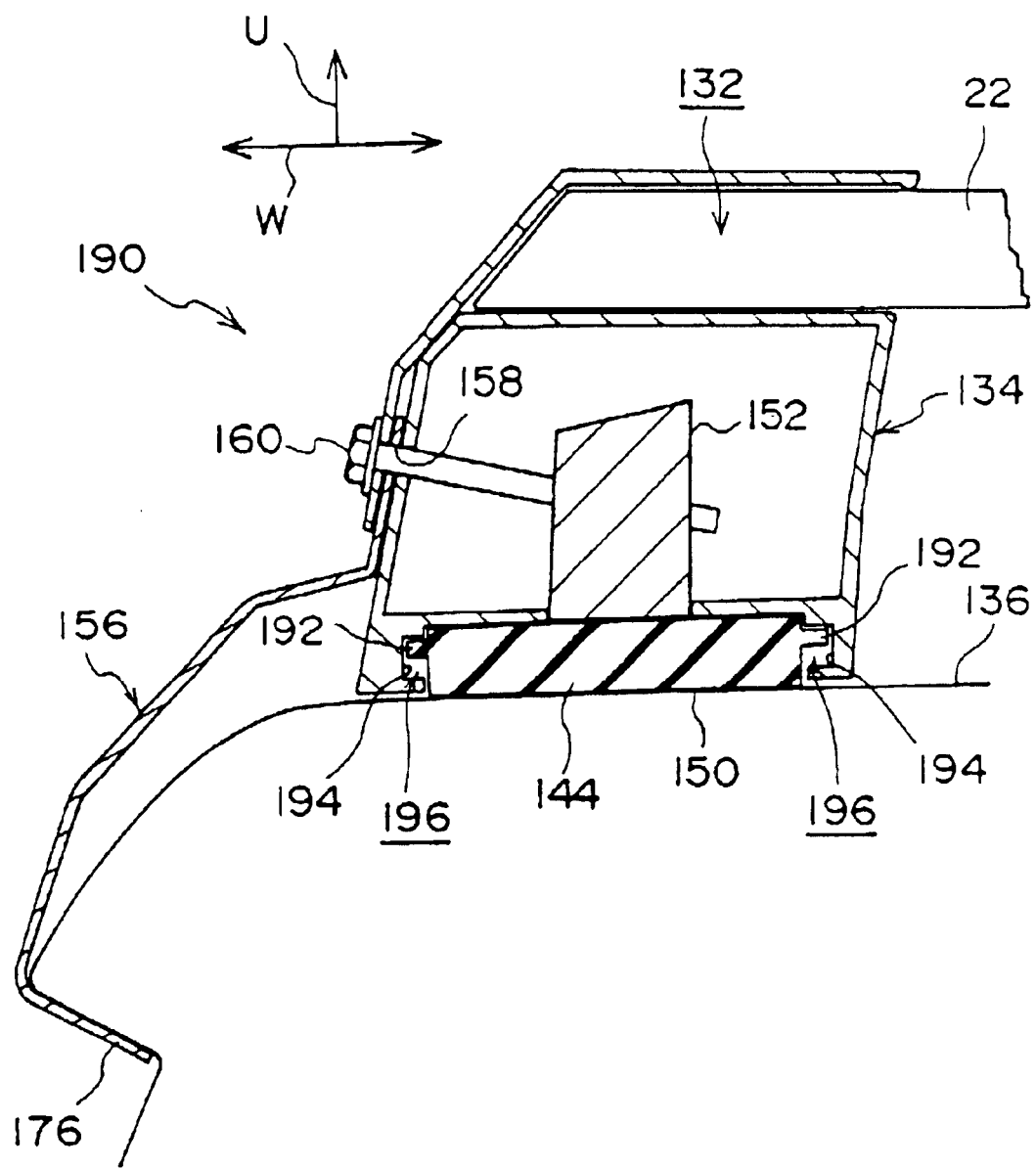
FIG. 15 is a sectional view showing a roof carrier mounted on a roof panel by means of a roof carrier mounting structure according to a fourth embodiment of the present invention.
Figure 16:
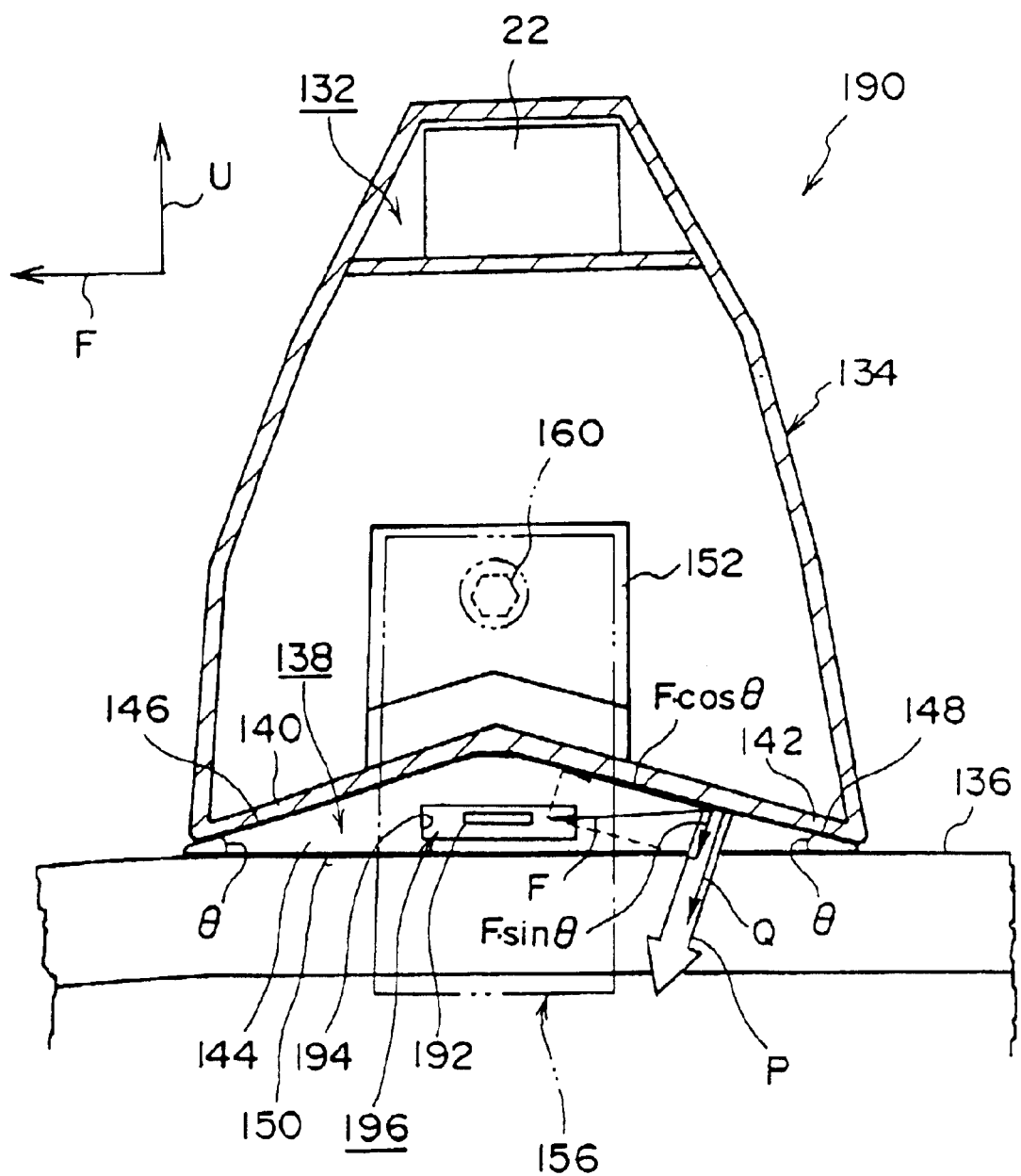
FIG. 16 is a schematic side view showing the roof carrier mounted on the roof panel by means of the roof carrier mounting structure according to the fourth embodiment of the present invention.

FIGS. 15 and 16 show a roof carrier 190 according to a fourth embodiment of the present invention. The roof carrier 190 has almost the same structure as the structure of the roof carrier 130 according to the third embodiment and only the structure in which the floating brake 144 is assembled with the concave housing portion 138 is different. In the fourth embodiment, the same components, members and the like as those in the first or third embodiment have the same reference numerals and their description will be omitted.

In the roof carrier 190, the engaging projection 162 and the slot 154 according to the third embodiment are not formed in the floating brake 144 and the concave housing portion 138. Instead, an engaging piece 192 is formed on the floating brake 144 and an engaging concave portion 194 is formed on the side face in the transverse direction of the concave housing portion 138 in the same manner as in the first embodiment. A predetermined gap 196 is formed on both sides in the longitudinal direction and in a lower portion thereof between the engaging piece 192 and the engaging concave portion 194. Due to the gap 196, the floating brake 144 can be relatively moved within a constant range with respect to the concave housing portion 138.

Accordingly, in the roof carrier 190 according to the fourth embodiment also, the engaging piece 192 can be housed in the concave engaging portion 194 by elastically deforming the floating brake 144 in the same manner as in the roof carrier 10 according to the first embodiment. After the engaging piece 192 is housed in the concave engaging portion 194, the engaging piece 192 and the concave engaging portion 194 are engaged with each other by the elastic reversion to its original state of the floating brake 144. As described above, the floating brake 144 can easily be assembled with the concave housing portion 138. Moreover, the floating brake 144 is not inadvertently separated from the concave housing portion 138.

During the rapid acceleration and deceleration of the vehicle, the force F·sin (θ) component of the inertia force F is applied as the force for pushing the floating brake 144 against the roof panel 136 in addition to the fastening force Q in the normal state, and these forces together form an overall fastening force P which is greater than the fastening force Q in the normal state. For this reason, even if the fastening force Q is small in the normal state, the amount of relative movement of the roof carrier 190 in the longitudinal direction with respect to the roof panel 136 can be reduced.

Figure 17:
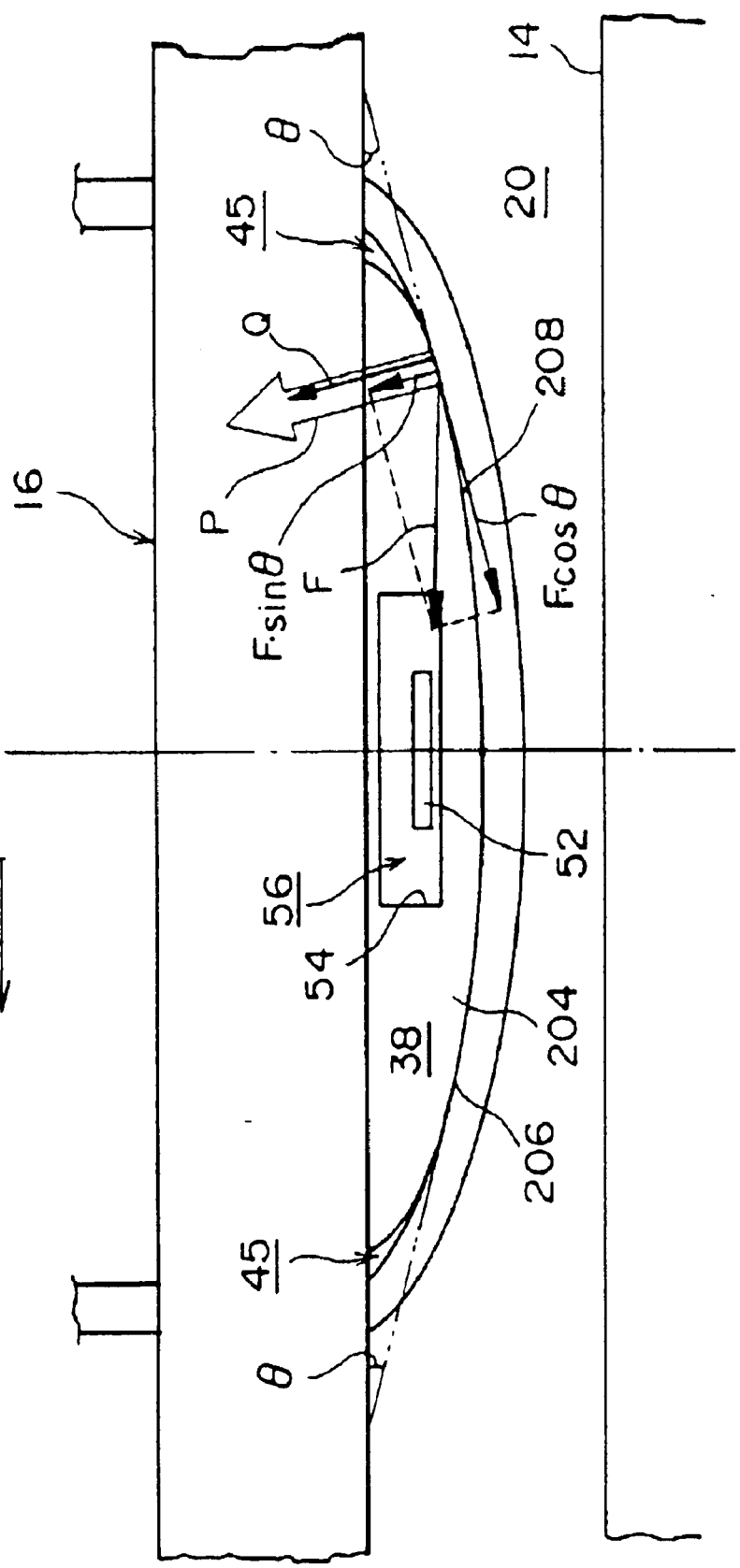
FIG. 17 is a partially enlarged front view showing a roof carrier mounted on a roof panel by means of a roof carrier mounting structure according to a fifth embodiment of the present invention.

In FIG. 17, a floating brake 204 to be applied to a roof carrier according to a fifth embodiment of the present invention is enlarged. In the roof carrier according to the fifth embodiment, only the shape of the floating brake 204 and the concave housing portion 38 are different from that of the roof carrier 10 according to the first embodiment. Therefore, the overall structure is omitted (see FIGS. 1 to 3). Moreover, the same components, members and the like as those in the first embodiment have the same reference numerals and their description will be omitted.

The floating brake 204 according to the fifth embodiment has an elliptical (more specifically, the shape of a portion under the major axis of an ellipse in a direction coincident with the longitudinal direction of the major axis) cross-section (an end face when seen from the transverse direction) Also in the floating brake 204, a forward inclined face 206 which gradually approaches the roof rail 16 the closer to the front of the vehicle is formed on the forward side of a center line C in the same manner as in the first embodiment, and similarly, a rearward inclined face 208 which gradually approaches the roof rail 16 the closer to the rear of the vehicle is formed on the rearward side of the center line C (the angle formed by the forward inclined face 206 and rearward inclined face 208 with respect to the lower face of the roof rail 16 has a value which varies depending on the position along the longitudinal direction).

Moreover, the concave housing portion 38 of the clamp 36 (see FIGS. 1 and 2) is also formed substantially in an elliptical shape corresponding to the shape of the floating brake 204. Gaps 45 are formed between the front and rear in the longitudinal direction of the floating brake 204 and the concave housing portion 38.

An engaging piece 52 projects from the side face of the floating brake 204 in the transverse direction. Correspondingly, a concave engaging portion 54 is formed on the side face of the concave housing portion 38 in the transverse direction. A predetermined gap 56 is formed on both sides in the longitudinal direction and in an upper portion between the engaging piece 52 and the engaging concave portion 54.

In the roof carrier according to the fifth embodiment which has this type of structure, it is possible to house the engaging piece 52 in the concave engaging portion 54 by elastically deforming the floating brake 204 in the same manner as in the roof carrier 10 according to the first embodiment. After the engaging piece 52 is housed in the concave engaging portion 54, the engaging piece 52 and the concave engaging portion 54 are engaged with each other by the elastic reversion to its original state of the floating brake 204. As described above, the floating brake 204 can easily be assembled into the concave housing portion 38. Moreover, the floating brake 204 is not inadvertently separated from the concave housing portion 38.

During the rapid acceleration and deceleration of the vehicle, the force F·sin (θ) component of the inertia force F is applied as the force for pushing the floating brake 204 against the roof rail 16 in addition to the fastening force Q in the normal state, and these forces together from an overall fastening force P which is greater than the fastening force Q in the normal state. For this reason, even if the fastening force Q is small in the normal state, the amount of relative movement of the roof carrier in the longitudinal direction with respect to the roof rail 16 can be reduced. In particular, the floating brake 204 moves relatively with respect to the housing concave portion 38 due to the structure of the gaps 45 and 56. Therefore, the fastening force P can be caused to act more effectively.

Figure 18:
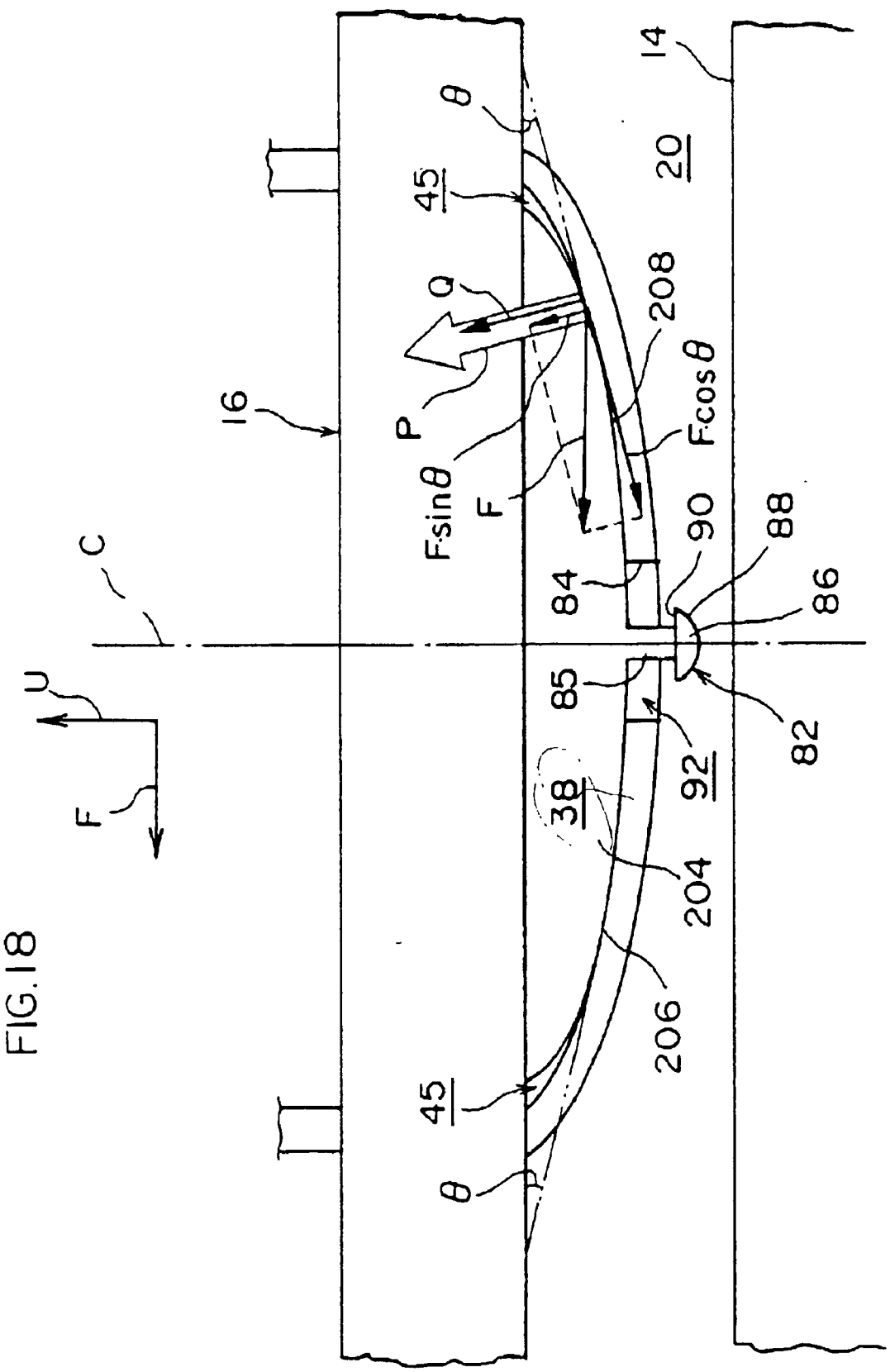
FIG. 18 is a partially enlarged front view showing the roof carrier mounted on the roof panel by means of the roof carrier mounting structure according to the fifth embodiment of the present invention, the roof carrier being of a different type from that shown in FIG. 17.

In the roof carrier according to the fifth embodiment, an engaging projection 82 and a slot 84 may be formed in the floating brake 204 and the housing concave portion 38 respectively in place of the engaging piece 52 and the concave engaging portion 54 in the same manner as in the roof carrier 80 according to the second embodiment (see FIG. 18). In this type of structure as well, the engaging projection 82 is pushed into the slot 84 and is elastically deformed and housed in the slot 84, thus enabling the floating brake 204 to be easily assembled with the housing concave portion 38.

Figure 19:
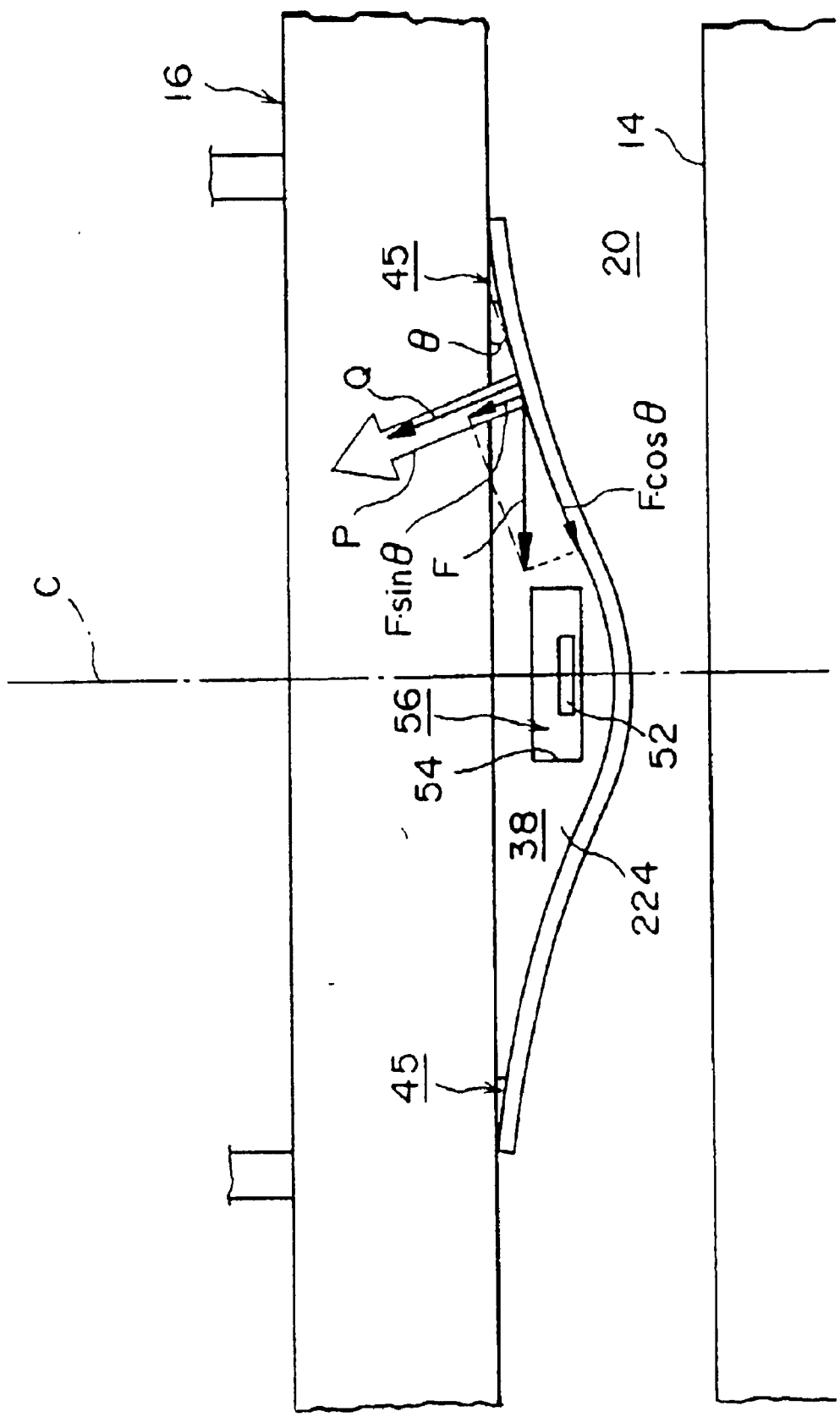
FIG. 19 is a partially enlarged front view showing a roof carrier mounted on a roof panel by means of a roof carrier mounting structure according to a sixth embodiment of the present invention.

In FIG. 19, a floating brake 224 to be applied to a roof carrier according to a sixth embodiment of the present invention is enlarged. In the same manner as in the roof carrier according to the fifth embodiment, in the roof carrier according to the sixth embodiment, only the shape of the floating brake 224 and the concave housing portion 38 are different from that of the roof carrier 10 according to the first embodiment. Therefore, the overall structure will be omitted (see FIGS. 1 to 3). Moreover, the same components, members and the like as those in the first embodiment have the same reference numerals and their description will be omitted.

The floating brake 224 according to the sixth embodiment has a substantially flattered cam-shaped lower face which is downwardly convex in the vicinity of a center line C and is upwardly convex at positions a predetermined distance or more away from the center line C as sectionally seen in the transverse direction. Also in the floating brake 224, a forward inclined face 226 which gradually approaches the roof rail 16 the closer to the front of the vehicle is formed on the forward side of the center line C, and similarly, a rearward inclined face 228 which gradually approaches the roof rail 16 the closer to the rear of the vehicle is formed on the rearward side of the center line C (The angle formed by the forward inclined face 226 and rearward inclined face 228 with respect to the lower face of the roof rail 16 has a value which varies depending on the position along the longitudinal direction).

Moreover, the concave housing portion 38 of the clamp 36 (see FIGS. 1 and 2) is also formed in a substantially flattered cam shape to match the shape of the floating brake 224. Gaps 45 are formed between the concave housing portion 38 and both ends in the longitudinal direction of the floating brake 224.

An engaging piece 52 projects from the side face of the floating brake 224 in the transverse direction. Correspondingly, a concave engaging portion 54 is formed on the side face of the concave housing portion 38 in the transverse direction. A predetermined gap 56 is formed on both sides in the longitudinal direction and in an upper portion between the engaging piece 52 and the engaging concave portion 54.

In the roof carrier according to the sixth embodiment which has the above structure as well, the engaging piece 52 can be housed in the concave engaging portion 54 by elastically deforming the floating brake 224 in the same manner as in the roof carrier 10 according to the first embodiment and the roof carrier according to the fifth embodiment. After the engaging piece 52 has been housed in the concave engaging portion 54, the engaging piece 52 and the engaging concave portion 54 are engaged with each other by the elastic reversion to its original state of the floating brake 224. As described above, the floating brake 224 can easily be assembled with the concave housing portion 38. Moreover, the floating brake 224 is not inadvertently separated from the concave engaging portion 54.

During the rapid acceleration and deceleration of the vehicle, the force F·sin (θ) component of the inertia force F is applied as the force for pushing the floating brake 224 against the roof rail 16 in addition to the fastening force Q in the normal state, and these forces together form an overall fastening force P which is greater than the fastening force Q in the normal state. For this reason, even if the fastening force Q is small in the normal state, the amount of relative movement of the roof carrier in the longitudinal direction with respect to the roof rail 16 can be reduced. In particular, the floating brake 224 moves relatively with respect to the housing concave portion 38 due to the structure of the gaps 45 and 56. Therefore, the fastening force P can be caused to act more effectively.

Figure 20:
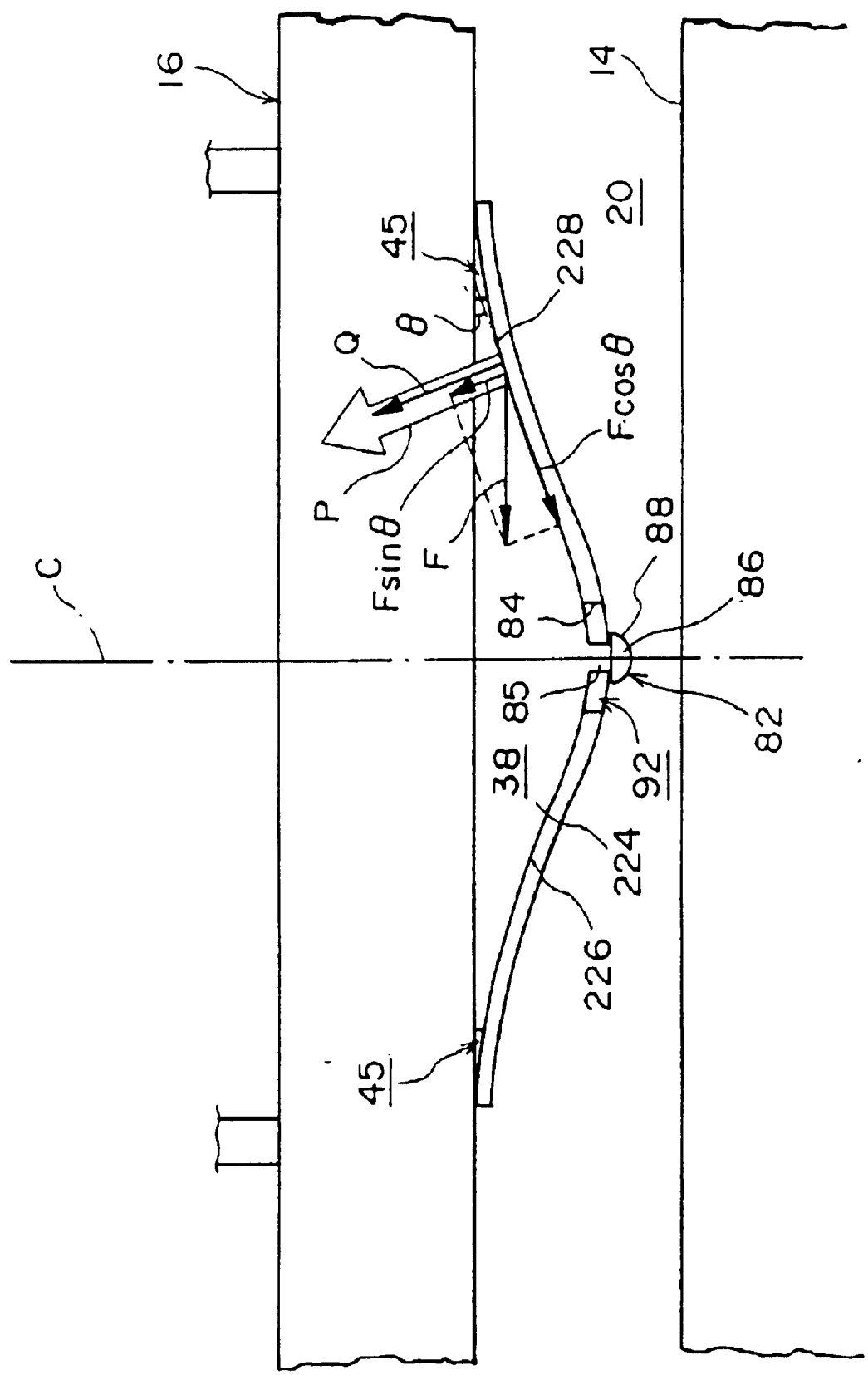
FIG. 20 is a partially enlarged front view showing the roof carrier mounted on the roof panel by means of the roof carrier mounting structure according to the sixth embodiment of the present invention, the roof carrier being of a different type from that shown in FIG. 19.

Also in the roof carrier according to the sixth embodiment, an engaging projection 82 and a slot 84 may be formed in the floating brake 224 and the concave housing portion 38 respectively instead of the engaging piece 52 and the engaging concave portion 54 in the same manner as in the roof carrier 80 according to the second embodiment and the roof carrier according to the fifth embodiment (see FIG. 20). In this type of structure as well, the engaging projection 82 is pushed into the slot 84 and is elastically deformed and housed in the slot 84, enabling the floating brake 224 to be easily assembled with the concave housing portion 38.

Figure 21:
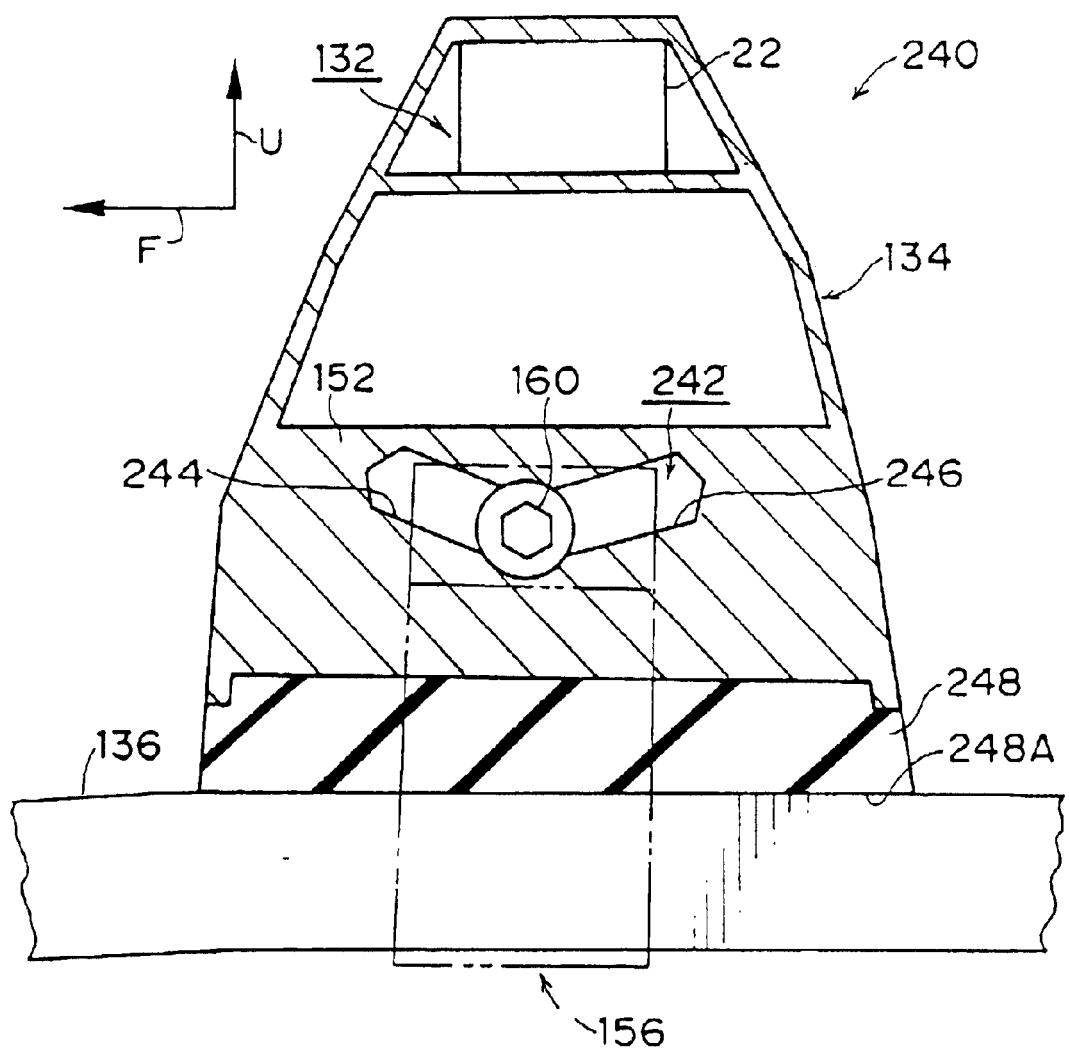
FIG. 21 is a sectional view showing a roof carrier mounted on a roof panel by means of a roof carrier mounting structure according to a seventh embodiment of the present invention.
Figure 22:
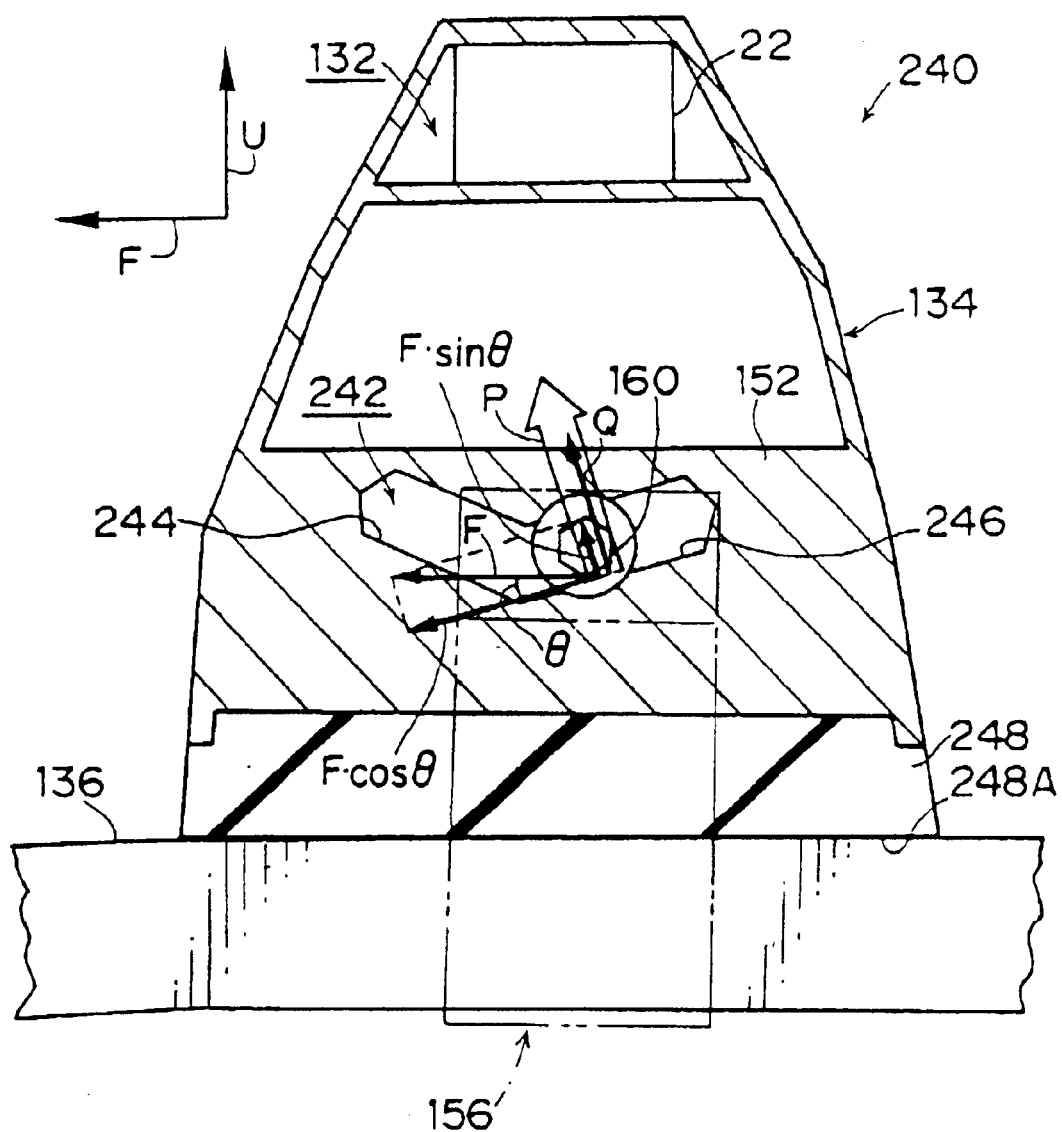
FIG. 22 is a sectional view showing the roof carrier mounted on the roof panel by means of the roof carrier mounting structure according to the seventh embodiment of the present invention.
Figure 23:
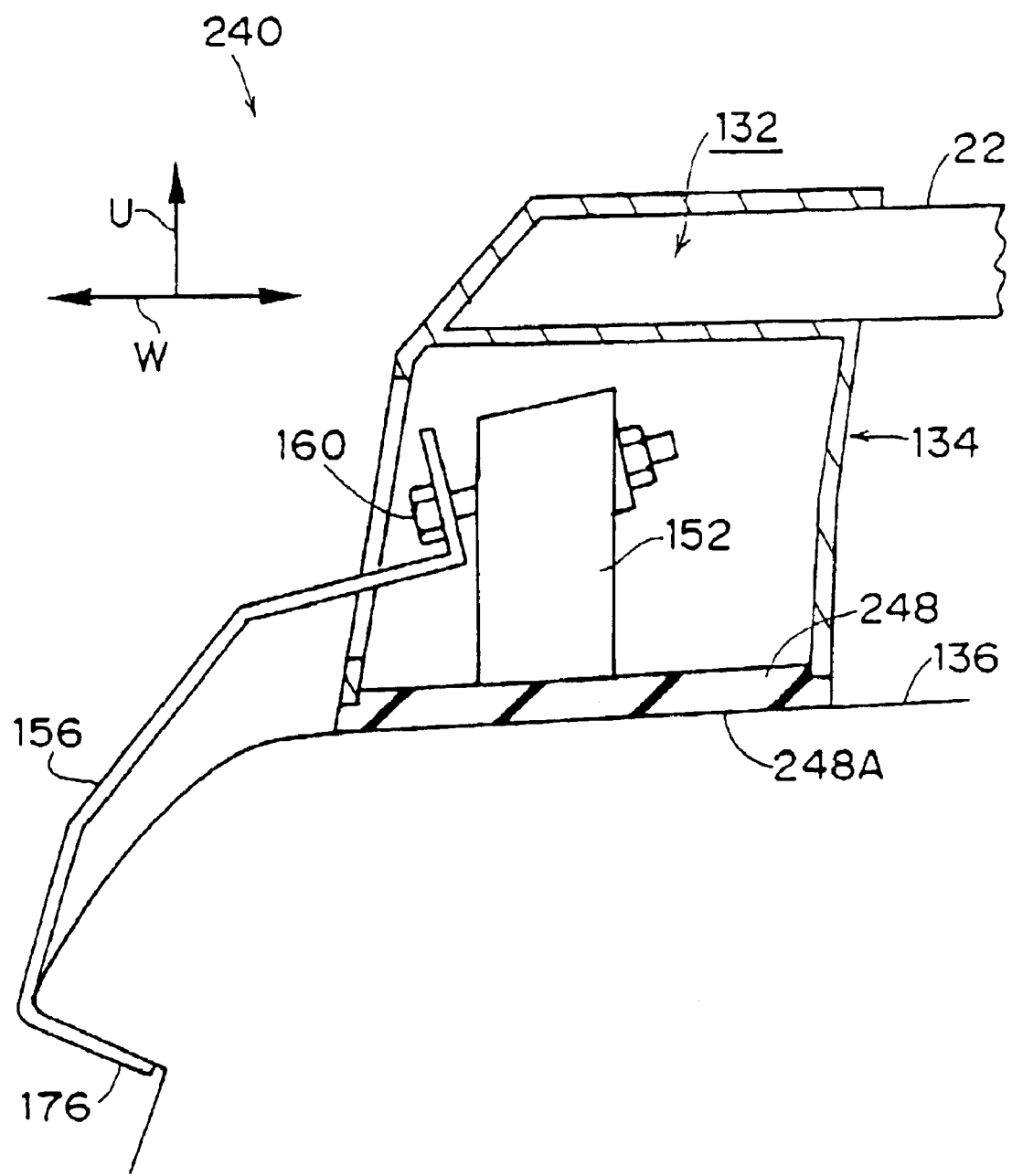
FIG. 23 is a sectional view showing the roof carrier mounted on the roof panel by means of the roof carrier mounting structure according to the seventh embodiment of the present invention.

FIGS. 21 to 23 show a roof carrier 240 according to a seventh embodiment of the present invention. The roof carrier 240 according to the seventh embodiment can also be directly mounted on a roof panel 136 in an automobile of a type having no roof rail attached thereto in the same manner as the roof carrier 130 according to the third embodiment, and has the same basic structure. The same components, members and the like as those in the third embodiment have the same reference numerals and their description will be omitted.

In the roof carrier 240, an almost flat V-shaped slit 242 seen from a side face in the transverse direction is formed on a holding block 152 fixed integrally with a casing 134. Since the slit 242 is thus V-shaped, a forward inclined face 244 which gradually separates from the roof panel 136 the closer to the front of the vehicle is formed on the forward side of the center. Similarly, a rearward inclined face 246 which gradually separates from the roof panel 136 the closer to the rear of the vehicle is formed on the rearward side of the center. Both the forward inclined face 244 and the rearward inclined face 246 are set to form a predetermined tilt angle θ with respect to the upper face of the roof rail 136.

A bolt 160 is inserted in the slit 242. The bolt 160 can be moved in the longitudinal direction along the slit 242. By this movement, the bolt 160 is also moved upward along the forward inclined face 244 or the rearward inclined face 246. Moreover, the upper portion of the clamp 156 is fixed to the head portion of the bolt 160. Accordingly, the clamp 156 can be relatively moved in the longitudinal direction with respect to the holding block 152 integrally with the bolt 160.

Furthermore, an elastic member 248 made of rubber is housed in the lower portion of the casing 134. The elastic member 248 is formed substantially in a rectangular shape which is different from the floating brakes according to each of the first to sixth embodiments, and the inclined face according to each of the first to sixth embodiments is not formed. The bottom face of the elastic member 248 is formed in-a planar shape and acts as a contact face 248A which comes in contact with the roof panel 136.

In the roof carrier 240 according to the seventh embodiment which has this type of structure, a bolt 160 is provided at the center of the slit 242, that is, in the closest position to the roof panel 136. The elastic member 248 is then elastically deformed in the normal state, as shown in FIG. 21, so that the roof panel 136 is held by a predetermined fastening force Q (see FIG. 22) by means of the contact face 248A of the elastic member 248 and a hook piece 176 of the clamp 156.

During the rapid deceleration of a vehicle, the inertia force of a load tries to move the casing 134 in the forward direction of the vehicle. However, the inertia force does not directly act on the clamp 156. Therefore, clamp 156 is held in a constant position with respect to the roof panel 136. Consequently, the bolt 160 moves relatively to the rearward direction of the vehicle within the slit 242 as shown in FIG. 22 (this inertia force is represented by F). In this movement, the bolt 160 tries to move upward along the rearward inclined face 246 and an F·sin ($\theta$) component of the inertia force F which is perpendicular to the rearward inclined face 246 acts on the clamp 156. As a result, a new fastening force F·sin ($\theta$) acts in addition to the fastening force Q in the normal state, and the overall fastening force becomes greater than the fastening force in the normal state, as shown by an arrow P in FIG. 22. Consequently, the roof carrier 240 is firmly fixed to the roof panel 136, and even if an inertia force is applied, the amount of relative movement of the roof carrier 240 with respect to the roof panel 136 is reduced. In addition, the more the inertia force acting on the load is increased, the greater becomes the overall fastening force. Therefore, the movement of the roof carrier 240 can be reduced more effectively.

While the above description has been given by taking the rapid deceleration of the vehicle as an example, in the rapid acceleration of the vehicle, the bolt 160 moves relatively to the forward direction of the vehicle within the slit 242 and the F·sin ($\theta$) component of the inertia force F which is perpendicular to the forward inclined face 244 acts on the clamp 156. Consequently, the overall fastening force becomes greater than the fastening force in the normal state. Consequently, even if the inertia force acts on the roof carrier 240, the amount of relative movement with respect to for the roof panel 136 is reduced.

Figure 24:
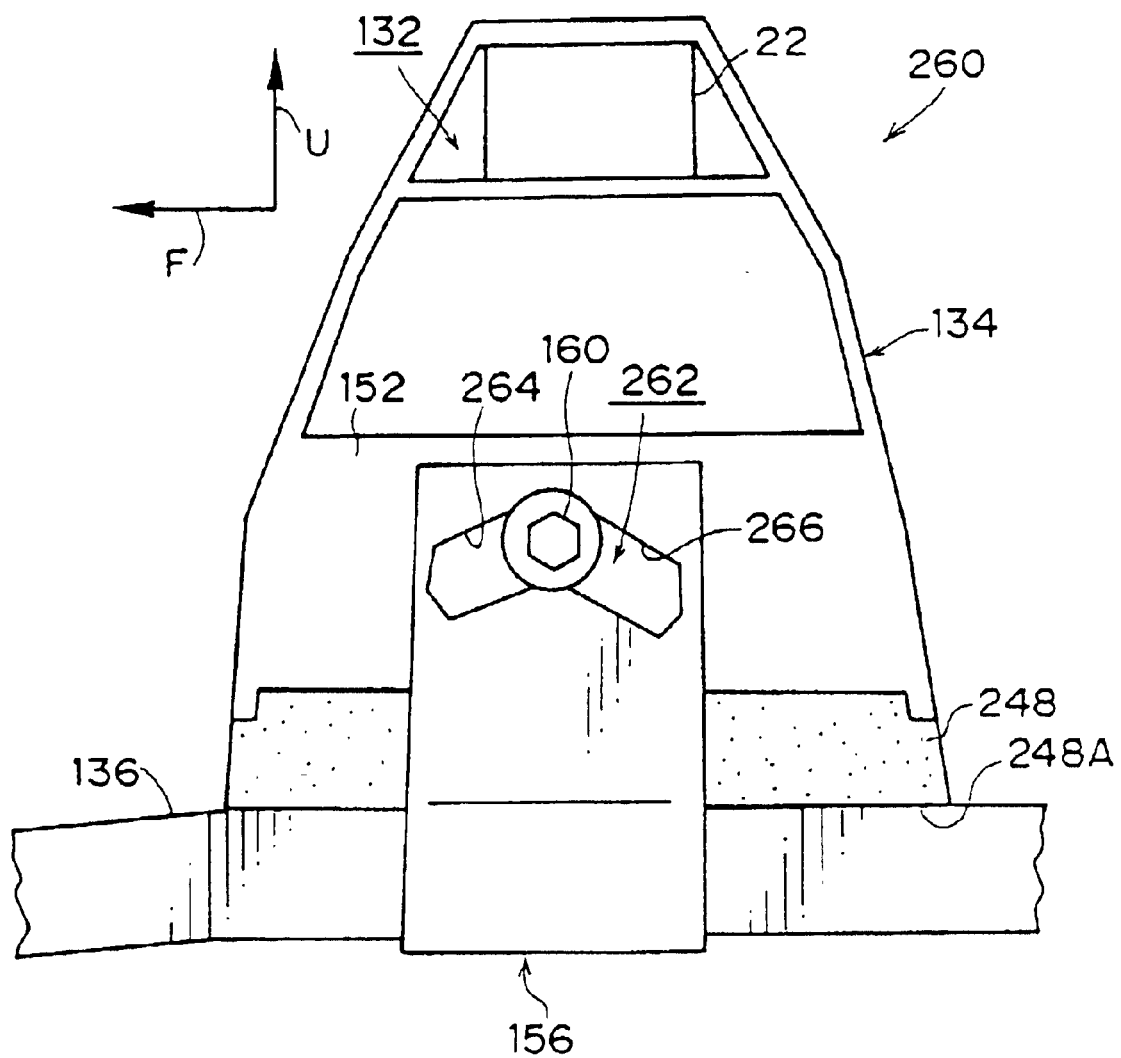
FIG. 24 is a side view showing a roof carrier mounted on a roof panel by means of a roof carrier mounting structure according to an eighth embodiment of the present invention.

FIG. 24 shows a roof carrier 260 according to an eighth embodiment of the present invention. The roof carrier 260 has almost the same structure as the structure of the roof carrier 240 according to the seventh embodiment, however, it is different from the roof carrier according to the seventh embodiment in that a bolt 160 is fixed so as to be immovable with respect to a holding block 152 and a substantially planar inverse V-shaped V slit 262 is formed in the upper portion of the clamp 156. The V slit 262 is provided with a forward inclined face 264 which gradually approaches the roof panel 136 the closer to the front of the vehicle from the center thereof and a rearward inclined face 266 which gradually approaches the roof panel 136 the closer to the rear of the vehicle from the center thereof. The head portion of the bolt 160 is inserted in the V slit 262.

In the roof carrier 260 according to the eighth embodiment, in the normal state, the clamp 156 is fixed such that the bolt 160 is positioned on the center of the V slit 262 as shown in FIG. 24. In this state, an elastic member 248 is elastically deformed and the roof panel 136 is held with a predetermined fastening force Q by means of between) a contact face 248A of the elastic member 248 and a hook piece 176 of the clamp 156.

During the rapid deceleration of a vehicle, the inertia force of a load tries to move the casing 134 in the forward direction of the vehicle. However, because the inertia force does not directly act on the clamp 156, the clamp 156 maintains a constant position with respect to the roof panel 136. Consequently, the bolt 160 moves in the forward direction of the vehicle within the V slit 262 (this inertia force is represented by F). By this movement, the bolt 160 hits against the forward inclined face 264 and the F·sin ($\theta$) component of the inertia force F which is perpendicular to the forward inclined face 264 acts on the clamp 156 in the same manner as in the eighth embodiment. As a result, a new fastening force F·sin ($\theta$) (FIG. 22) acts in addition to the fastening force Q in the normal state, and the overall fastening force becomes greater than the fastening force in the normal state. Consequently, the roof carrier 260 is firmly fixed to the roof panel 136 and, even if an inertia force is applied, the amount of relative movement of the roof carrier 260 with respect to the roof panel 136 is reduced. In addition, the move the inertia force acting on the load is increased, the greater the overall fastening force becomes. Therefore, the movement of the roof carrier 260 can be reduced more effectively.

While the above description has been given by taking the rapid deceleration of the vehicle as an example, in the rapid acceleration of the vehicle, the bolt 160 is relatively-moved in the rearward direction of the vehicle within the slit 262 and the F·sin ($\theta$) component of the inertia force F which is perpendicular to the rearward inclined face 266 acts on the clamp 156. Consequently, the overall fastening force becomes greater than the fastening force in the normal state. Consequently, even if the inertia force acts on the roof carrier 260, the amount of relative movement for the roof panel 136 is reduced.

As is apparent from the above description, the member forming the V slit is not particularly restricted, and it is sufficient if a portion of the inertia force F is converted into fastening force when the casing 134 and the clamp 156 are relatively moved by the inertia force F during the rapid acceleration or deceleration of the vehicle. If the v slit is formed on the casing 134 (holding block 152) as in the seventh embodiment, the appearance of the roof carrier 240 can be improved because the slit 242 is covered by the clamp 156 and can not seen from the outside. A member (a cover or the like) for covering the slit 242 is not required so that the number of parts is not increased. On the other hand, in the case where the clamp 156, is to be formed as in the eighth embodiment, the effects of the present invention can be obtained by replacing only the clamp of an existing roof carrier with the clamp 156 according to the eighth embodiment.

Figure 25:
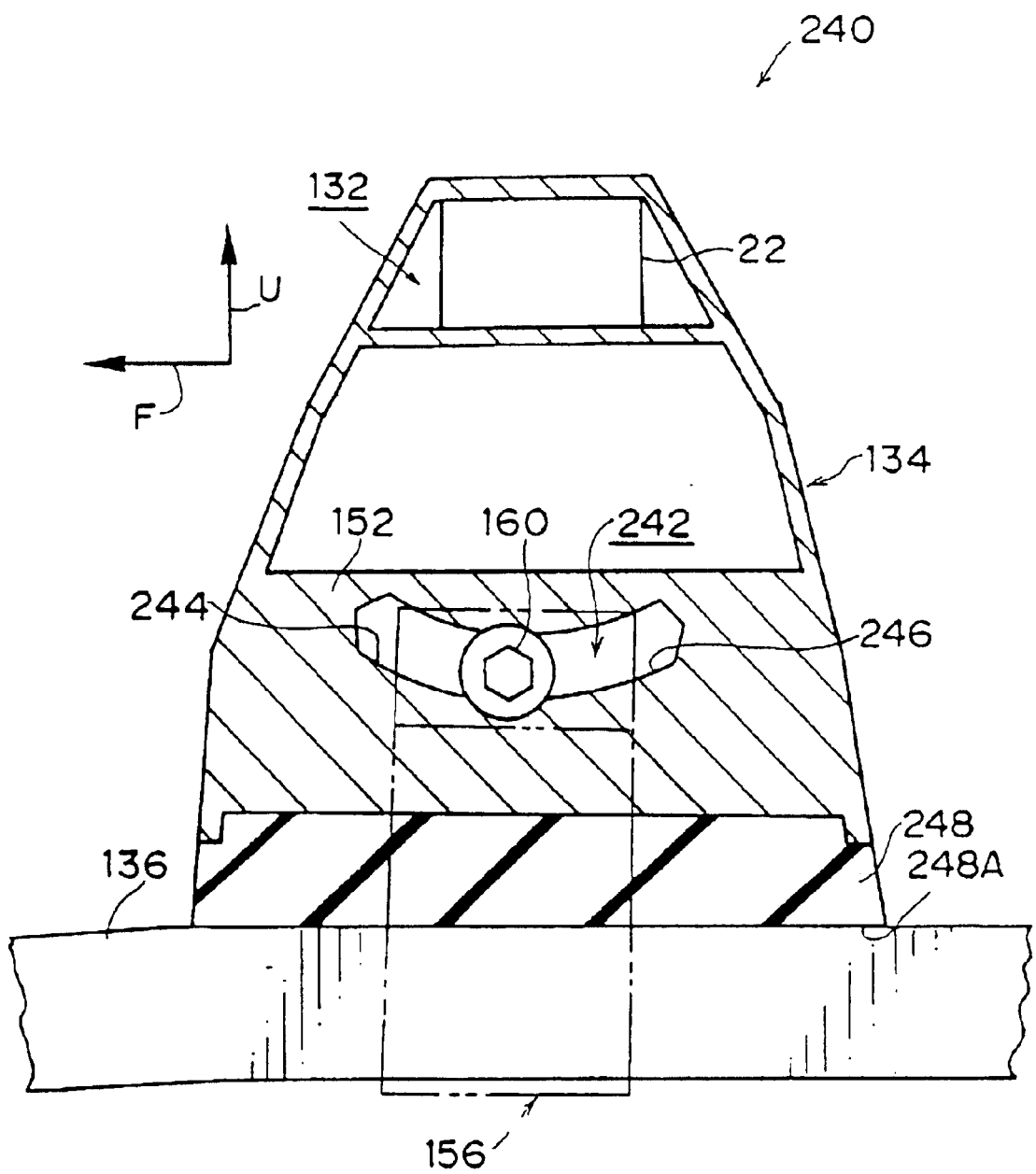
FIG. 25 is a sectional view showing another example of the roof carrier mounted on the roof panel by means of the roof carrier mounting structure according to the seventh embodiment of the present invention.
Figure 26:
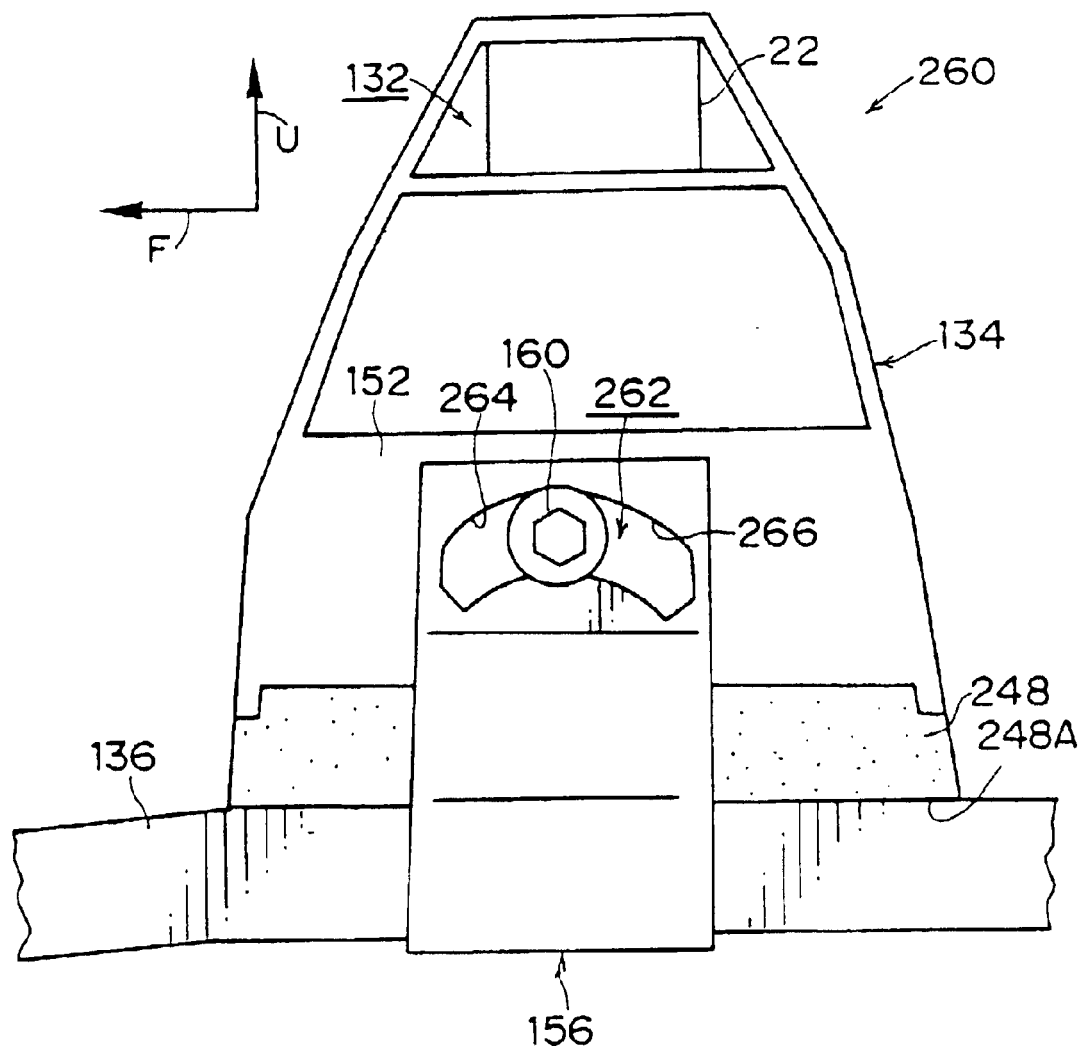
FIG. 26 is a side view showing another example of the roof carrier mounted on the roof panel by means of the roof carrier mounting structure according to the eighth embodiment of the present invention.

Moreover, the slits 242 and 262 are not restricted to the above-mentioned V shape. For example, the slits 242 and 262 may have a substantially elliptical curved shape as shown in FIGS. 25 and 26.

Figure 27:
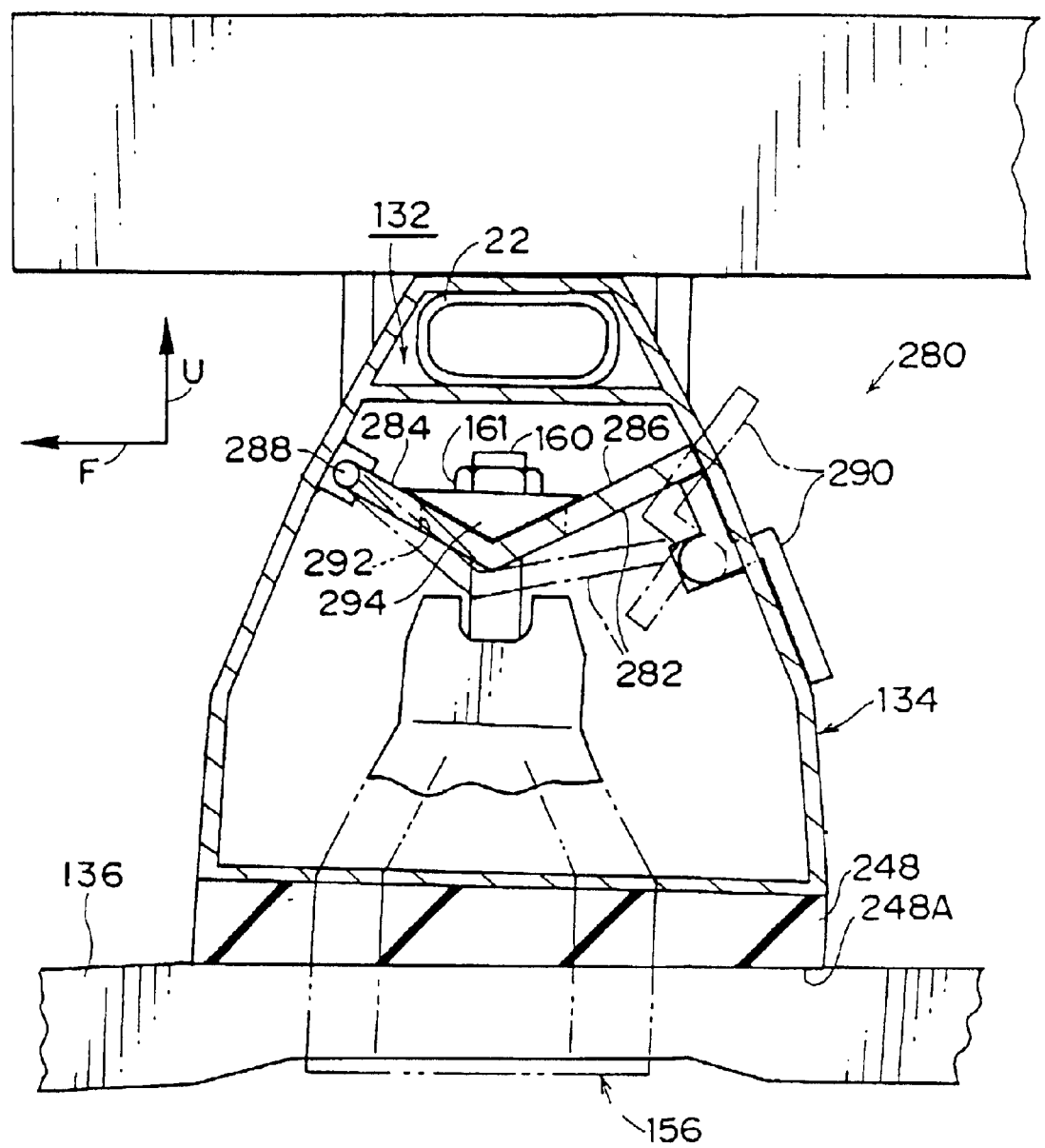
FIG. 27 is a sectional view showing a roof carrier mounted on a roof panel by means of a roof carrier mounting structure according to a ninth embodiment of the present invention.
Figure 28:
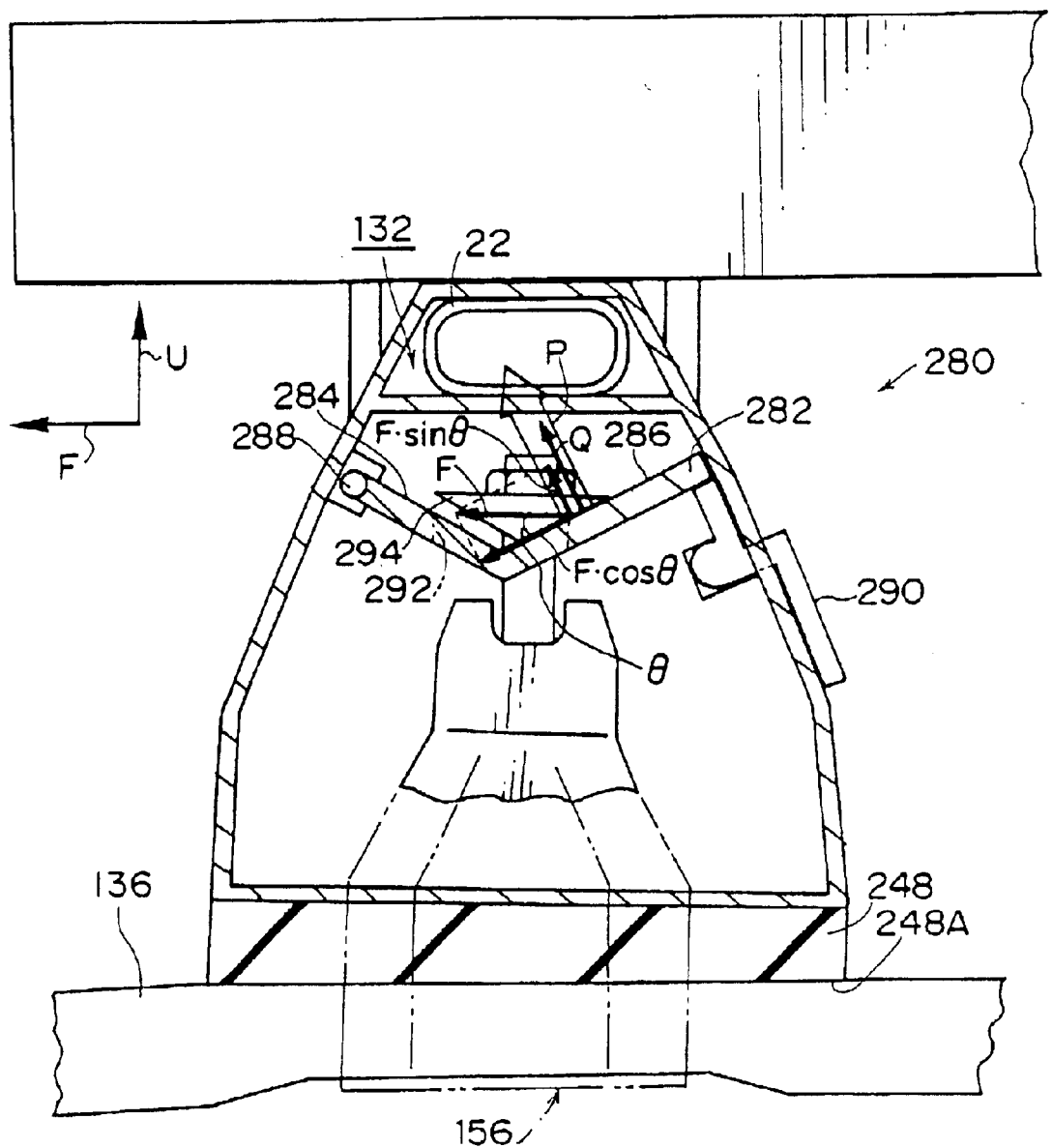
FIG. 28 is a sectional view showing the roof carrier mounted on the roof panel by means of the roof carrier mounting structure according to the eighth embodiment of the present invention.
Figure 29:
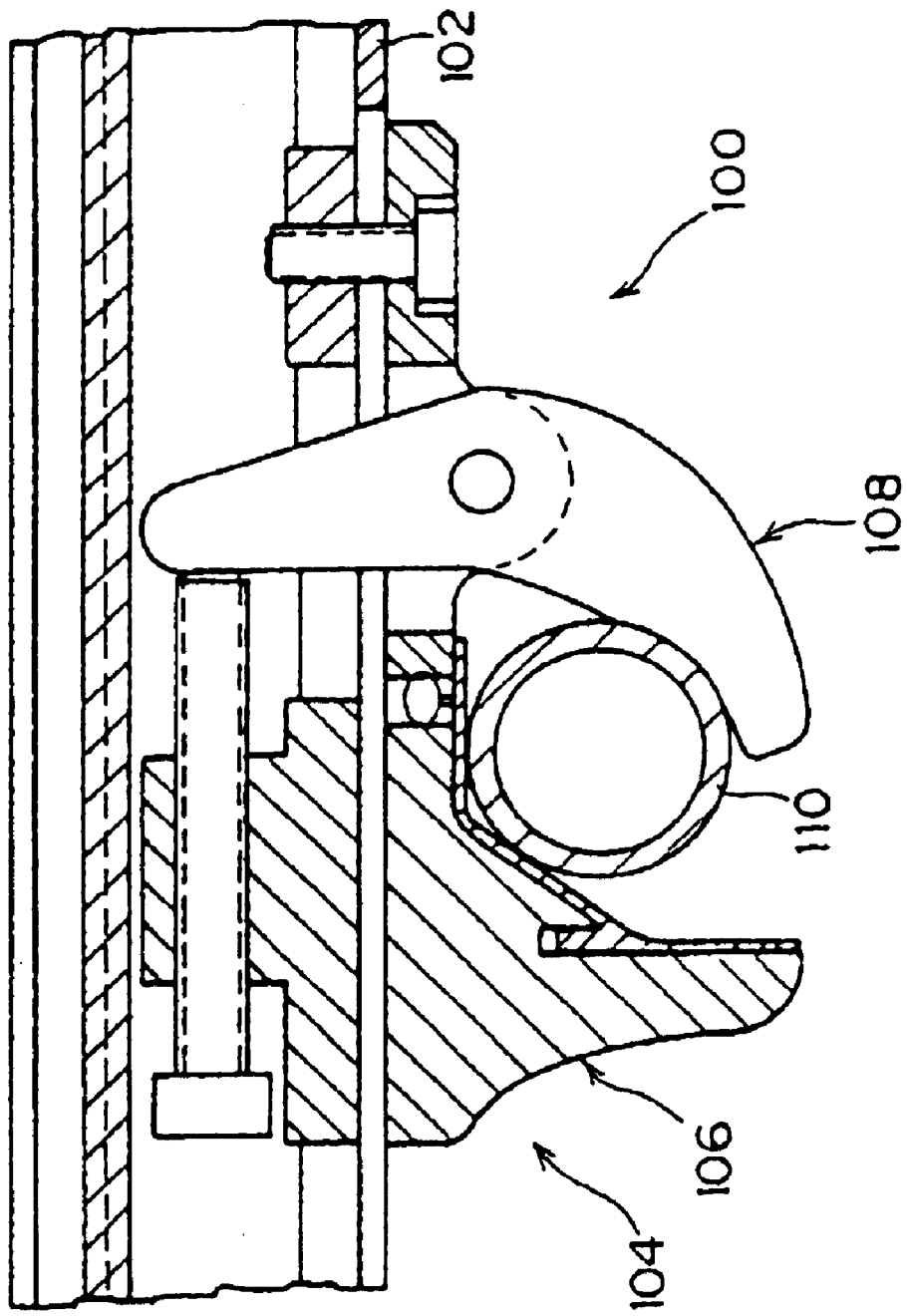
FIG. 29 is a sectional view showing a roof carrier mounting structure according to the prior art.
Figure 30:
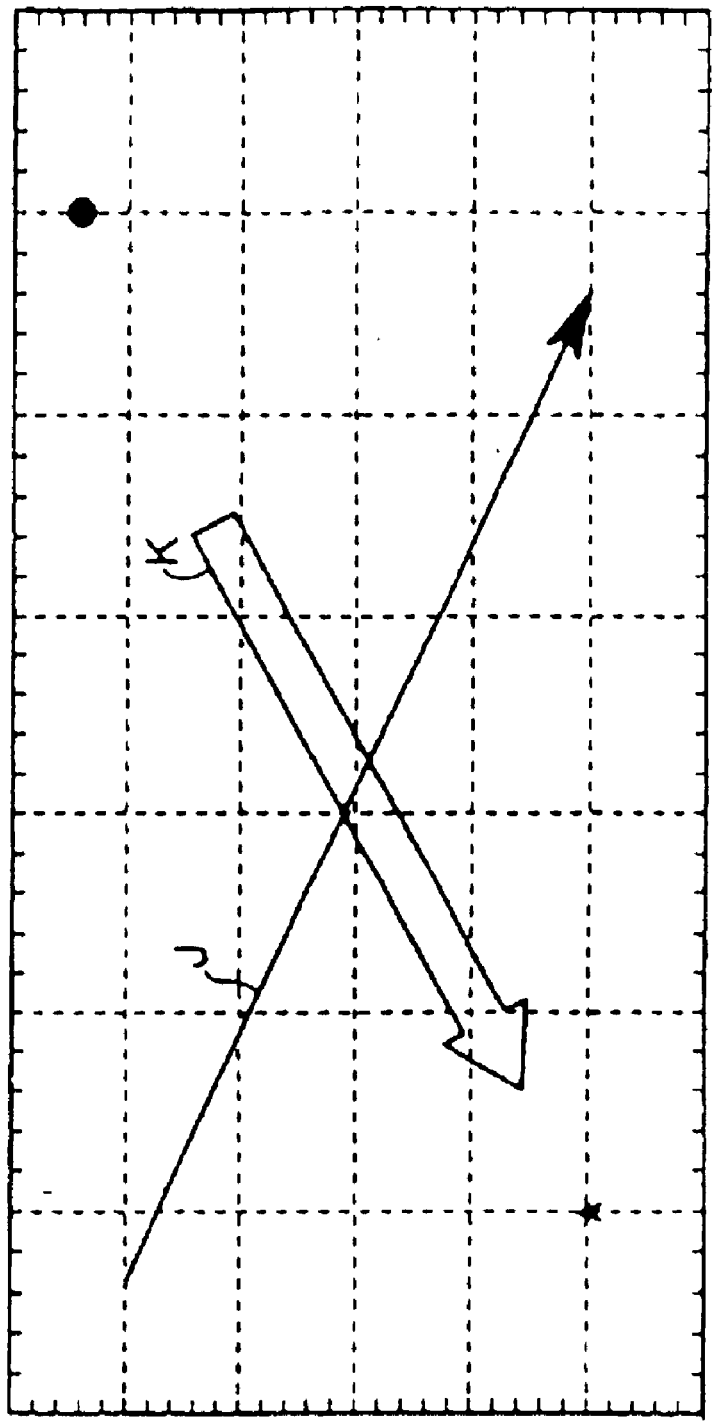
FIG. 30 is a graph showing a general relationship between fastening torque in the roof carrier mounting structure and the amount of movement of the roof carrier relative to the roof rail according to the prior art and the present invention.

FIGS. 27 and 28 show a roof carrier 280 according to a ninth embodiment of the present invention. The roof carrier 280 according to the ninth embodiment can also be directly mounted on a roof panel 136 in an automobile of a type having no roof rail fixed thereto in the same manner as the roof carrier 130 according to the third embodiment, and has the same basic structure. The same components, members and the like have as those in the third embodiment have the same reference numerals and their description will be omitted.

In the roof carrier 280, an inclined wall-like member 282 formed substantially in a flattened V shape when seen from a side face is provided in a casing 134 instead of the holding block 152 according to the third embodiment. The inclined wall-like member 282 is rotatably fixed to the casing 134 by means of a spindle 288 formed at one end in the longitudinal direction (on the left side in the drawing). Moreover, a crank type lever 290 is rotatably mounted to the casing 134 at a position opposite to the spindle 288 in the longitudinal direction. The lever 290 supports the free end of the inclined wall-like member 282 from below. By rotating the lever 290, the inclined wall-like member 282 can be moved between the position of upward rotation shown by the solid line of FIG. 27 and the position of downward rotation shown by the one-dot chain line.

A forward inclined face 284 which gradually separates from the roof panel 136 the closer to the front of the vehicle is formed on the forward side of the vehicle from the center of the inclined wall-like member 282. Similarly, a rearward inclined face 286 which gradually separates from the roof panel 136 the closer to the rear of the vehicle is formed on the rearward side of the vehicle from the center of the inclined wall-like member 282.

A slot 292 is formed in the inclined wall-like member 282 in the longitudinal direction of the vehicle. A bolt 160 is inserted in the slot 292 with the head portion thereof facing downwards. Moreover, a nut 161 screwed onto the bolt 160 is in contact with at least one of the forward inclined face 284 and the rearward inclined face 286 through an elastic member 294 made of rubber. Consequently, the bolt 160 can be moved in the longitudinal direction along the slot 292, but not removed therefrom. When the bolt 160 is moved in the longitudinal direction of the vehicle, an upward movement is carried out along the forward inclined face 284 or the rearward inclined face 286. Moreover, the upper end of the clamp 156 is fixed to the head portion of the bolt 160.

In the roof carrier 280 according to the ninth embodiment which has the above structure, when the roof carrier 280 is to be mounted on the roof panel 136, a lever 290 is first operated such that the inclined wall-like member 282 is rotated to the downward position, as shown by the one-dot chain line of FIG. 27. Consequently, the clamp 156 is also moved downward so that a sufficient gap is formed between the elastic member 294 and the clamp 156 for the mounting operation to be easily performed.

After the roof carrier 280 has been disposed such that the roof panel 136 is positioned in the gap between the elastic member 294 and the clamp 156, the lever 290 is operated to rotate the inclined wall-like member 282 upward as shown by the solid line in FIG. 27. Consequently, the clamp 156 is moved upward so that the gap formed with the elastic member 294 is reduced. As a result, the clamp 156 and the elastic member 294 sandwich the roof panel 136 with a constant fastening force Q. For this reason, the roof carrier 280 does not move in the longitudinal direction of the vehicle with respect to the roof panel 136.

During the rapid deceleration of a vehicle, the inertia force of the load tries to move the casing 134 in the forward direction of the vehicle. However, the inertia force does not act directly on the clamp 156. Therefore, the casing 134 is held in a constant position with respect to the roof panel 136. Consequently, the bolt 160 is relatively moved in the rearward direction of the vehicle within the slit 292 (this inertia force is represented by F), as shown in FIG. 28. Due to this movement, the bolt 160 tries to move upward along the rearward inclined face 286 and the F·sin (θ) component of the inertia force F which is perpendicular to the rearward inclined face 286 acts on the clamp 156. As a result, a new fastening force F·sin (θ) acts in addition to the fastening force Q in the normal state, and the overall fastening force becomes greater than the fastening force in the normal state, as shown by an arrow P in FIG. 28. Consequently, the roof carrier 280 is firmly fixed to the roof panel 136, and even if an inertia force is applied, the amount of relative movement of the roof carrier 280 with respect to the roof panel 136 is reduced. In addition, the more the inertia force acting on the load increases, the greater the overall fastening force becomes. Therefore, the movement of the roof carrier 280 can be reduced more effectively.

While the above description has been given by taking the rapid deceleration of the vehicle as an example, in the rapid acceleration of the vehicle, the bolt 160 moves relatively in the forward direction of the vehicle within the slit 292 and the F·sin (θ) component of the inertia force F which is perpendicular to the forward inclined face 288 acts on the clamp 156. Consequently, the overall fastening force becomes greater than the fastening force in the normal state, and even if an inertia force is applied to the roof carrier 280, the amount of relative movement of the roof panel 136 is reduced.

As described above, in the roof carrier mounting structure according to the present invention, a portion of the inertia force acting during the rapid acceleration or deceleration of the vehicle is utilized to increase the fastening force for pressing the floating brakes 44, 144, 204 and 224 against the roof rail 16 or the roof panel 136, or the fastening force (interposing force) of the casing 134 and the clamp 156 for the roof panel 136. Therefore, even if the fastening force (fastening torque) in the normal state is set at less than in the prior art, it is possible to reduce the amount of relative movement of the roof carrier with respect to the roof rail 16 or the roof panel 136 during the rapid acceleration or deceleration of the vehicle. By setting the fastening force (fastening torque) small in the normal state, the size and weight of each of the roof carriers 10, 80, 130, 240, 260 and 280 can be reduced.

Figure 11:
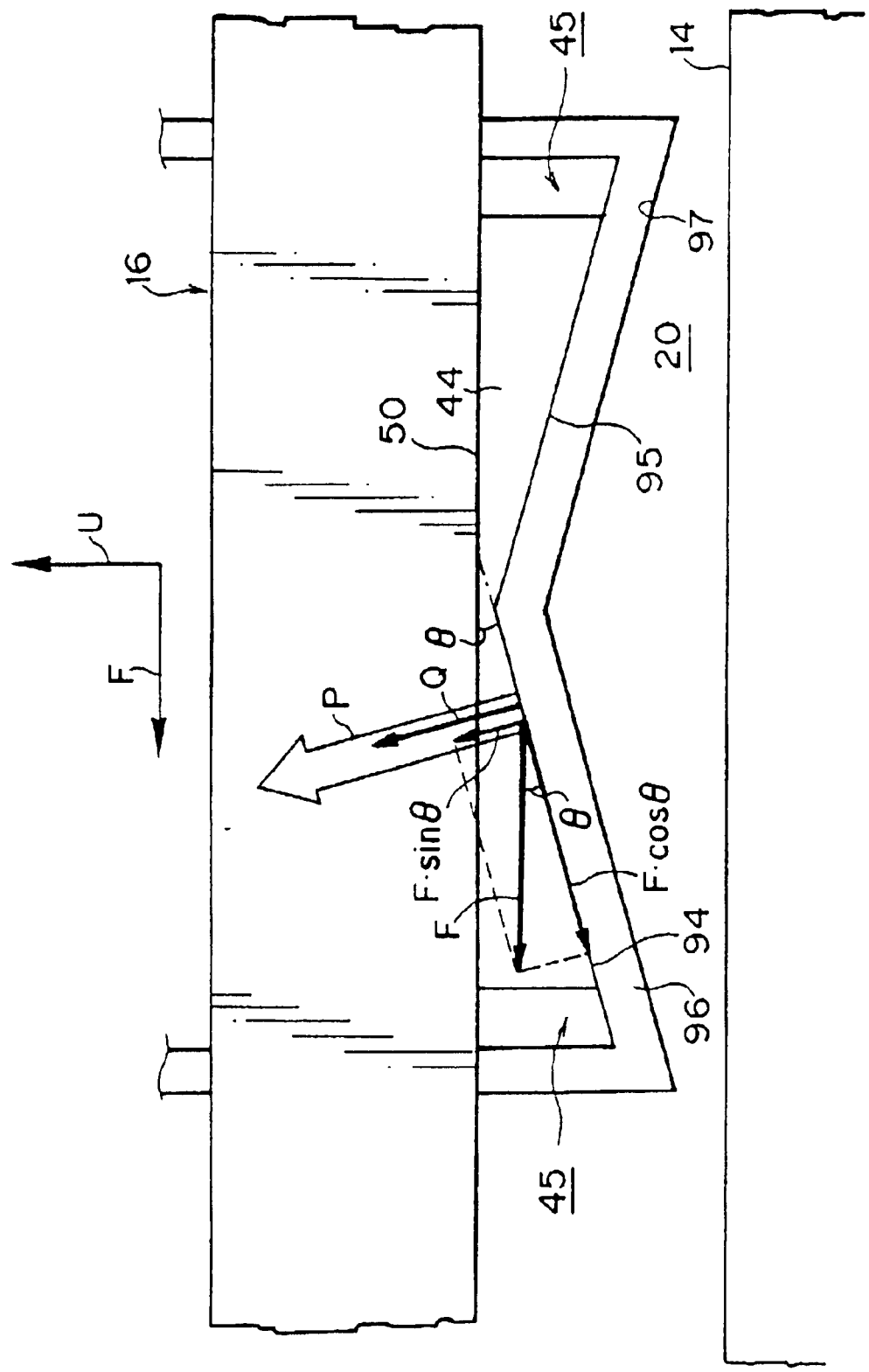
FIG. 11 is a view illustrating another example of a floating brake according to the present invention.

Provided that a portion of the inertia force acting during the rapid acceleration and deceleration of the vehicle can be utilized to increase the fastening force (fastening torque), the present invention is not restricted to the above-mentioned structure. As shown in FIG. 11, for example, the floating brake 44 may be provided with the rearward inclined face 95 which gradually approaches the roof rail 16 the closer to the front of the vehicle and a forward inclined face 94 which gradually approaches the roof rail 16 the closer to the rear of the vehicle. The concave housing portion 38 also bulges upward at the center in the longitudinal direction, thereby forming the forward inclined wall 96 and the rearward inclined wall 97, so as to come in contact with the forward inclined face 94 and the rearward inclined face 95 of the floating brake 44. With this structure, the roles of the forward inclined face and the rearward inclined face are reversed as compared with the floating brake 44 having the shape shown in FIGS. 3 and 5, the floating brake 144 having the shape shown in FIG. 14 and the like. More specifically, the forward inclined face 94 of the floating brake 44 is pushed from the forward inclined wall 96 of the concave housing portion 38 during the rapid deceleration of the vehicle, and the rearward inclined face 95 of the floating brake 44 is pushed from the rearward inclined wall 97 of the concave housing portion 38 during the rapid acceleration of the vehicle. However, even in this case, a portion of the inertia force acting during the rapid acceleration or deceleration of the vehicle can be caused to act as fastening force in the same way as the floating brake 44 shown in FIGS. 3 and 5, the floating brake 144 shown in FIG. 14 and the like.

Moreover, the floating brakes 204 and 224 having the structures shown in FIGS. 17 to 20 may also be applied to the roof carrier of the type shown in FIGS. 12 to 14 (which can be directly mounted on the roof panel 136).

Furthermore, the material of each of the floating brakes 44, 144, 204 and 224 is not restricted to the above-mentioned rubber and any material which can be elastically deformed and pressed (attached) to the roof rail 16 by pressure can be used. For example, it is sufficient if at least the portion which abuts against the roof rail 16 is formed of an elastic material such as a resin having a predetermined elasticity. In this case, portions other than the portion which abuts against the roof rail 16 can be formed of a material (metal or the like) having a small elasticity.

If the floating brake is made of a material having a small elasticity, the engaging pieces 52 and 192 and the engaging projections 82 and 162 may be formed of materials having predetermined elasticity and may be fixed to the floating brake afterwards. More specifically, the predetermined elasticity can be kept for the engaging pieces 52 and 192 and the engaging projections 82 and 162. Therefore, the floating brake can easily be assembled with the concave housing portion.

While the coefficient of friction (the magnitude of friction) between the floating brake and the forward inclined walls 40 and 140, the rearward inclined walls 42 and 142 and the floating brake and the roof rail 16 or the roof panel 136 is not particularly restricted, it is preferable that the coefficient of friction of the floating brake and the forward inclined walls 40 and 140 and the rearward inclined walls 42 and 142 should be smaller than the coefficient of friction of the floating brake and the roof rail 16 or the roof panel 136. More specifically, the coefficient of friction is thus set so that the floating brake easily slips relatively with respect to the forward inclined walls 40 and 140 and the rearward inclined walls 42 and 142. Therefore, the floating brake is pushed toward the roof rail 16 and the roof panel 136 more firmly. Thus, a large fastening force can be obtained.

What is claimed is:

1. A mounting unit for mounting each of opposite sides of a roof carrier on a supporting part on a vehicle having front and rear portions, comprising:

a mounting member;

a sandwiching member connected to said mounting member for sandwiching the supporting part between said mounting member and said sandwiching member;

a first inclined portion inclined with respect to the supporting part and approaching the supporting part toward the front portion of the vehicle; and a second inclined portion inclined with respect to the supporting part and approaching the supporting part toward the rear portion of the vehicle;

a connecting member connecting said sandwiching member and said mounting member; and a slit portion including the first inclined portion and the second inclined portion, said slit portion being formed in one of said mounting member or said sandwiching member, wherein one end portion of said connecting member is inserted in said slit portion so as to be movable on the first inclined portion or the second inclined portion when acceleration or deceleration having a predetermined value or more acts in the longitudinal direction, such that a force acting on said roof carrier in the longitudinal direction generates a fastening force for fastening said roof carrier to the supporting part by the one of said mounting member of said sandwiching member being moved in the longitudinal direction relative to said connecting member.

2. The mounting unit of claim 1, further comprising a member having at least an elastically deformable portion and mounted between said mounting member and the supporting part.

3. The mounting unit of claim 1, wherein the slit portion is formed on said sandwiching member, and the first and the second inclined portions are formed on said sandwiching member.

4. The mounting unit of claim 3, wherein one end of said connecting member is disposed on a holding portion mounted within said mounting member.

5. The mounting unit of claim 1, wherein the slit portion is formed on said mounting member, and the first and the second inclined portions are formed on said mounting member.

6. The mounting unit of claim 5, wherein one end of said connecting member is disposed on a holding portion mounted within said mounting portion, the first and the second inclined portions being formed on the holding portion.

* * * * *